(12) United States Patent
Bauer et al.

(10) Patent No.: US 12,428,147 B2
(45) Date of Patent: *Sep. 30, 2025

(54) UNMANNED AERIAL VEHICLE INSPECTION SYSTEM

(71) Applicant: Skydio, Inc., San Mateo, CA (US)

(72) Inventors: Mark Patrick Bauer, San Francisco, CA (US); Bernard J. Michini, San Francisco, CA (US); Brett Michael Bethke, Millbrae, CA (US)

(73) Assignee: Skydio, Inc., San Mateo, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/471,864

(22) Filed: Sep. 21, 2023

(65) Prior Publication Data

US 2024/0092483 A1    Mar. 21, 2024

Related U.S. Application Data

(63) Continuation of application No. 17/524,932, filed on Nov. 12, 2021, now Pat. No. 11,794,890, which is a
(Continued)

(51) Int. Cl.
| | |
|---|---|
| *B64C 29/00* | (2006.01) |
| *B64U 50/11* | (2023.01) |
| *B64U 70/60* | (2023.01) |
| *G08G 5/26* | (2025.01) |
| *G08G 5/32* | (2025.01) |

(Continued)

(52) U.S. Cl.
CPC .......... *B64C 29/0025* (2013.01); *G08G 5/26* (2025.01); *G08G 5/32* (2025.01); *G08G 5/52* (2025.01); *G08G 5/55* (2025.01); *G08G 5/57* (2025.01); *G08G 5/74* (2025.01); *B64U 50/11* (2023.01); *B64U 70/60* (2023.01); *B64U 2101/30* (2023.01); *B64U 2201/10* (2023.01); *B64U 2201/20* (2023.01)

(58) Field of Classification Search
CPC ............ B64C 29/0025; B64U 2101/30; G05D 1/2235; G08G 5/26
See application file for complete search history.

(56) References Cited

U.S. PATENT DOCUMENTS

| | | |
|---|---|---|
| 9,269,239 B1 | 2/2016 | Jensen et al. |
| 9,609,288 B1 | 3/2017 | Richman et al. |

(Continued)

*Primary Examiner* — Tyler J Lee

(57) ABSTRACT

A portion of a vertical structure is determined for inspection by an unmanned aerial vehicle. A flight plan including safe locations around the vertical structure is determined. Each of the safe locations is associated with a respective column of waypoints. The unmanned aerial vehicle navigates according to the flight plan by navigating to a first safe location of the safe locations, navigating vertically along a first column associated with the first safe location, activating sensors to obtain respective sensor information at at least some of the waypoints associated with the first safe location, navigating to a second safe location of the safe locations, navigating vertically along a second column associated with the second safe location, and activating the sensors to obtain respective sensor information at at least some of the waypoints associated with the second safe location.

20 Claims, 16 Drawing Sheets

Related U.S. Application Data continuation of application No. 15/638,267, filed on Jun. 29, 2017, now Pat. No. 11,203,425.

(60) Provisional application No. 62/356,893, filed on Jun. 30, 2016.

(51) Int. Cl.
  *G08G 5/52* (2025.01)
  *G08G 5/55* (2025.01)
  *G08G 5/57* (2025.01)
  *G08G 5/74* (2025.01)
  *B64U 101/30* (2023.01)

(56) References Cited

U.S. PATENT DOCUMENTS

| | | |
|---|---|---|
| 9,738,381 B1 | 8/2017 | Loud et al. |
| 9,891,631 B1 | 2/2018 | Hanlon |
| 10,035,592 B1 | 7/2018 | Hanlon |
| 11,034,245 B1 | 6/2021 | Cottrell |
| 2013/0317667 A1 | 11/2013 | Kruglick |
| 2014/0032034 A1 | 1/2014 | Raptopoulos et al. |
| 2015/0131079 A1 | 5/2015 | Heinonen et al. |
| 2015/0353196 A1 | 12/2015 | van Cruyningen et al. |
| 2016/0129999 A1 | 5/2016 | Mays |
| 2016/0229533 A1 | 8/2016 | van Cruyningen |
| 2016/0232792 A1 | 8/2016 | van Cruyningen |
| 2016/0327959 A1 | 11/2016 | Brown et al. |
| 2017/0259920 A1 | 9/2017 | Lai et al. |
| 2018/0032088 A1 | 2/2018 | van Cruyningen |
| 2018/0077350 A1 | 3/2018 | Grenier et al. |
| 2018/0095478 A1* | 4/2018 | van Cruyningen ..... G01S 19/14 |

* cited by examiner

UNMANNED AERIAL VEHICLE INSPECTION SYSTEM

CROSS-REFERENCE TO RELATED APPLICATION(S)

This application is a continuation of U.S. patent application Ser. No. 17/524,932, filed Nov. 12, 2023, which claims priority to and the benefit of U.S. patent application Ser. No. 15/638,267, filed Jun. 29, 2017, which claims the benefit of priority to U.S. Provisional Patent Application No. 62/356,893, filed Jun. 30, 2016, the entire disclosure of which is hereby incorporated by reference.

BACKGROUND

Inspecting a vertical structure (e.g., a cell phone tower, a nuclear radiator, and so on) for damage, or other reasons, can include significant time investments by personnel trained to perform the inspection. Additionally, companies involved in inspection generally need to devote substantial time training personnel, and then ensuring the personnel are following proper safety and governmental procedures.

SUMMARY

Particular embodiments of the subject matter described in this specification can be implemented so as to realize one or more of the following advantages. Utilizing an unmanned aerial vehicle (UAV), an operator can quickly and safely obtain detailed image and/or other sensor data of structures. By working with a UAV, the operator can initiate an automatic scanning process of identified structures, without having to place himself/herself in harm's way and without requiring cumbersome and expensive equipment, such as cranes or raised or suspended platforms. Furthermore, by enabling an operator to intelligently define a safe flight plan of a UAV, and enable the UAV to follow the flight plan and intelligently react to contingencies, the UAV can be placed in a greatly reduced risk of harm.

In general, one innovative aspect of the subject matter described in this specification can be embodied in a system, computer readable media and methods that include the actions of obtaining, from a user device, flight operation information describing an inspection of a vertical structure to be performed, the flight operation information including locations of one or more safe locations for vertical inspection; determining that a location of the UAV corresponds to a first safe location; in response to the determination, performing a first inspection of the structure at the first safe location, the first inspection including activating the one or more cameras; traveling to a second safe location, and performing a second inspection of the structure, the second inspection including activating the one or more cameras; and providing, to the user device, information associated with the inspection, the information including images obtained from the one or more cameras.

Another innovative aspect of the subject matter described in this specification can be embodied in a system, computer readable media and methods that include the actions of receiving, by a UAV, a flight plan comprising one or more inspection locations for a structure, wherein the one or more inspection locations each comprise a waypoint having a geospatial reference; navigating the UAV to ascend to a first altitude; conducting an inspection for an inspection location, the inspection comprising: (navigating the UAV to a location above an inspection location; navigating the UAV to fly vertically above the inspection location; and triggering one or more sensors at one or more altitudes to obtain sensor information describing the structure); repeating the conducting an inspection for at least another of the one or more inspection locations; and navigating the UAV to a landing location. The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Like reference numbers and designations in the various drawings indicate like elements.

DETAILED DESCRIPTION

Figure 1A:
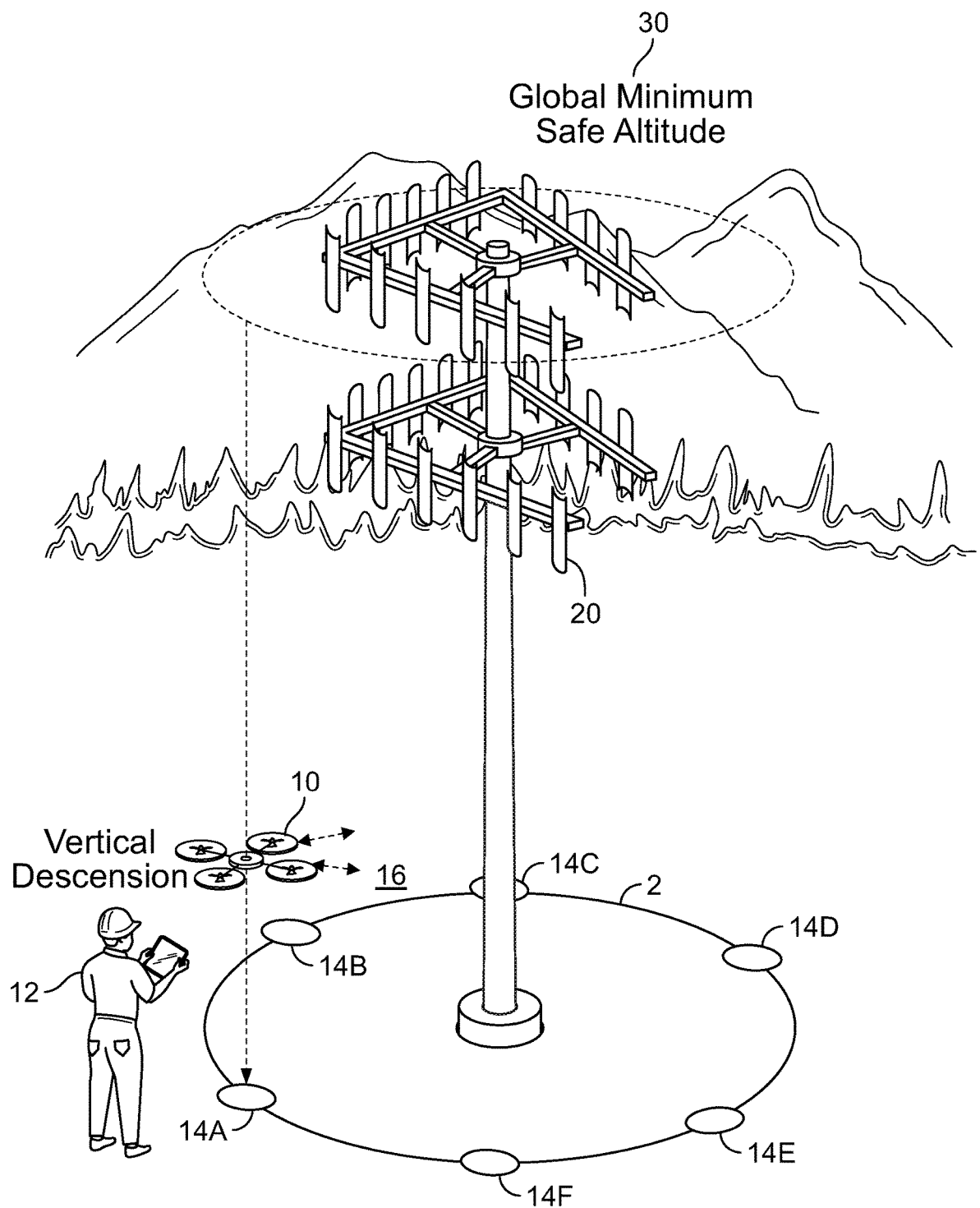
FIG. 1A illustrates an example of an Unmanned Aerial Vehicle (UAV) performing a vertical inspection of a structure.

This specification describes systems and methods to safely implement inspections of one or more vertical structures by unmanned aerial vehicles (UAVs). Optionally, the inspections can be facilitated by a human operator who determines initial information that informs a flight plan, and who then provides the information to a UAV to effect the flight plan. In this specification, UAVs include any unmanned aerial vehicles, such as drones, unpiloted aerial vehicles, remotely piloted aircraft, unmanned aircraft systems, any aircraft covered under Circular 328 AN/190 classified by the International Civil Aviation Organization, and so on. For example, the UAV may be in the form of a single or multi-rotor copter (e.g., a quad-copter) or a fixed wing aircraft. In addition, certain aspects of the disclosure can be utilized with other types of unmanned vehicles (e.g., wheeled, tracked, and/or water vehicles).

As will be described, optionally an operator can interact with a user device that executes (e.g., runs) an application (e.g., an 'app' downloaded from an electronic application store) which enables generation of flight plans to be provided to a UAV or via a web service accessed by the user device (e.g., via a browser), where a remote server executes the application. Similarly, a UAV can execute an application that is in communication with the user device (such as a ground control system) (or the remote server), which receives information describing the flight plan, and utilizes the information to perform vertical inspections. To determine a flight plan, the operator can move (e.g., walk) around a vertical structure of interest, and mark points in a radius around the structure that are clear of vertical obstructions. For instance, the operator can stand within a horizontal distance from the structure, gaze upwards, and upon determining that no obstructions exist above them (e.g., tree branches, guy-wires, or other obstructions within a threshold distance above his/her head), can utilize the user device (e.g., laptop, mobile device, or the UAV itself) to obtain and store location information (e.g., Global Positioning System (GPS) coordinates, cell tower triangulation location information, etc.).

The operator can determine additional information, including location information identifying a centroid of the structure (e.g., the operator can utilize satellite imagery or map data to identify a GPS coordinate). After the operator provides the location information (e.g., by entering the above location information for storage in the user device), the user device can provide the information to the UAV. The centroid of the structure can be determined by various methods. For example, geospatial readings may be taken from equidistant points on either side of the structure. The user device or the UAV, may then calculate a lat/long of the center of the geospatial readings. Also, a ranger finder, or LIDAR sensor may be used by the UAV when identifying vertical inspection locations, and calculating the center of the structure based on the information returned.

Upon receipt of the information, the UAV can initiate an inspection of the structure (e.g., upon receiving an initiation command or request from the operator). As will be further described in FIG. 1A, the UAV can travel (e.g., fly vertically and/or horizontally) to a first safe location (also referred to as vertical inspection location) recorded by the operator as being free of vertical obstructions at a height indicated by the operator as being safe to travel (e.g., above the structure, above or below other obstructions such as freeways, buildings, powerlines, guidewires, and so on). After reaching the first safe location at the height (e.g., a global minimum safe altitude as described below), the UAV can descend in a vertical line to a threshold distance above the ground. As the UAV descends, the UAV can activate one or more sensors (e.g., visible and/or non-visible light cameras, RF sensors, chemical sensors, sound sensors, spectrometers, magnetometers, radiometers, wind sensors, ambient light sensors, barometers, temperature sensors, thermal imagers, range sensors, and/or other sensors), and so on, which capture real-world information describing the structure and/or the structure environment (e.g., optical images, heat information, radiation information, chemical emissions, range information, multi-spectral information, and so on). The UAV can store the real-world information along with metadata (e.g., time information associated with each activation, position and attitude data of the UAV, distance of the UAV from the structure, wind information, ambient light information, and so on). The UAV can then ascend, activate one or more of the sensors, and upon reaching the safe height (e.g., global minimum safe altitude), can travel to a subsequent safe location. The sensors may be selectively activated, where certain sensors may be activated at different times, altitudes, range distances from the structure, etc.

The real-world information gathered during the inspection can be provided to the operator's user device after the UAV completes the inspection. For instance, the UAV can provide the information wirelessly (e.g., using a BLUETOOTH connection, a Wi-Fi connection, a near field communication connection, and so on) and/or using a wired connection with the user device. As will be described, the user device, or a server system in communication with the user device, can optionally generate 3D information from the real-world information and metadata (e.g., a 3D model of the vertical structure).

FIG. 1A illustrates an example of an Unmanned Aerial Vehicle (UAV) 10 performing a vertical inspection of a structure 20. As illustrated, the UAV 10 is descending from a global safe minimum altitude 30 (e.g., an altitude identified by the operator 12 as being free of obstructions, which affords the UAV safe travel over the structure 20) at a safe location 14A in a vertical line downwards. As described above, the operator 12 can indicate safe locations (e.g., safe locations 14A-14F) that are free of obstructions in a vertical direction above the safe location (e.g., enabling the UAV to safely descend and ascend in the vertical direction). The UAV can be limited to a particular geofence surrounding the structure 20 (e.g., circular geofence 2 that includes the safe locations 14A-14-F on its circumference). The geofence can be indicated by the operator 12, and can be a greater radius than the distance from the safe locations 14A-14F.

As the UAV descends, real-world information 16 is gathered describing the structure 20. For instance, the UAV can include sensor modules, including electro-optic sensors, infra-red sensors, cameras (e.g., multi-spectral cameras, visual cameras), and so on. The UAV can optionally keep a portion of itself (e.g., a front of the UAV) and/or one or more sensors pointed at the center (e.g., centroid) of the structure 20. As will be described, the operator 12 can provide information identifying a centroid of the structure 20 (e.g., using satellite imagery), and the UAV can ensure that the UAV and/or one or more sensors are pointed at the centroid. In this way, the sensor, camera, data can always include the structure 20, taken from a same perspective as the UAV descends. Additionally, the UAV can ensure that as it descends, it maintains a same threshold distance from the structure 20 (e.g., using sensors that can accurately obtain distance and range measurements, such as LiDAR, Leddar, or Sonar).

The real-world information 16 can be gathered according to one or more triggers as the UAV 10 descends. For instance, the UAV can selectively activate one or more of the included sensors, periodically (e.g., every 3 seconds, 10 seconds), based on a distance descended (e.g., every 10 centimeters, every ¼ meter, every meter, and so on), in response to an event, etc. For example, if a first sensor senses a first event, a second sensor may be activated in response. Additionally, the triggers can depend on capabilities of the UAV and included sensors, such as a focal length of the camera (e.g., a shorter focal length can provide a wider angle of view, enabling less pictures to be taken), an aperture of the camera (e.g., a wider aperture can enable the camera to obtain pictures with less noise, by utilizing a lower ISO in cloudy conditions, but have shallower depth of field and potentially require more images), and so on.

The UAV 10 descends until it reaches a threshold distance above the ground, and ascends from the threshold distance back to the global minimum safe altitude 30. As will be described below, the UAV 10 can determine that one or more of the sensors, were not successfully triggered, leaving a hole in the coverage of the structure 20. Optionally, the UAV can activate the sensors, as it ascends back to the global minimum safe altitude 30, or while descending at another safe location (e.g., as described in FIG. 1C). Optionally, the UAV can travel to the location associated with the hole, and activate the sensors. Re-activating sensors, due to incomplete, corrupted, poorly exposed, bad imagery or sensor information is described further below. The safe locations are referred to as vertical inspection locations in the specification.

Figure 1B:
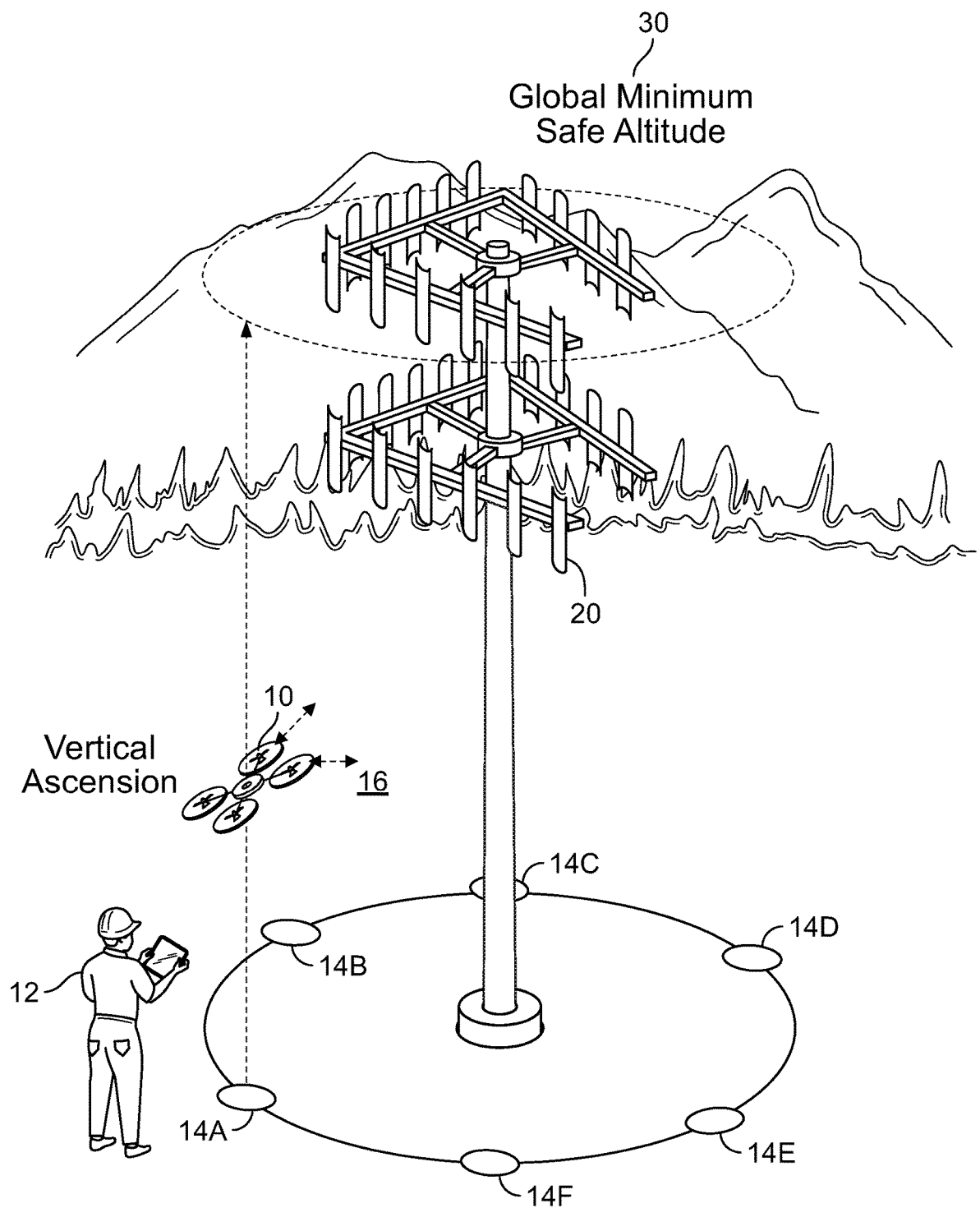
FIG. 1B illustrates an example of the UAV ascending during the vertical inspection of the structure.

FIG. 1B illustrates the UAV 10 ascending during the vertical inspection of the structure 20 at a vertical inspection location. As illustrated, the UAV 10 has completed descending to a minimum threshold distance above the ground, and has begun ascending back to the global minimum safe altitude 30.

Optionally, one or more of the sensors may be mounted on gimbals. Optionally, the UAV 10, or gimbals that control attitudes of the sensors and cameras, can angle upwards as the UAV 10 ascends (e.g., a 15 degree, 30 degree, 45 degree, angle upwards) to obtain oblique imagery of the structure 20. By gathering real-world information 16 of the structure 20 at an angle pointed upwards, the UAV 10 can capture details, which would otherwise be hidden. Additionally, some materials on the structure 20 can provide useful information if light interacts with the materials at particular angles (e.g., a retroreflector).

After ascending to the global minimum altitude 30, the UAV 10 travels to a subsequent safe location (e.g., safe location 14B), to again descend in a vertical line at the safe location. The UAV can store information describing an order in which the UAV is to travel to safe locations, and after inspecting at a safe location, the UAV can travel to a subsequent safe location according to the order.

Figure 1C:
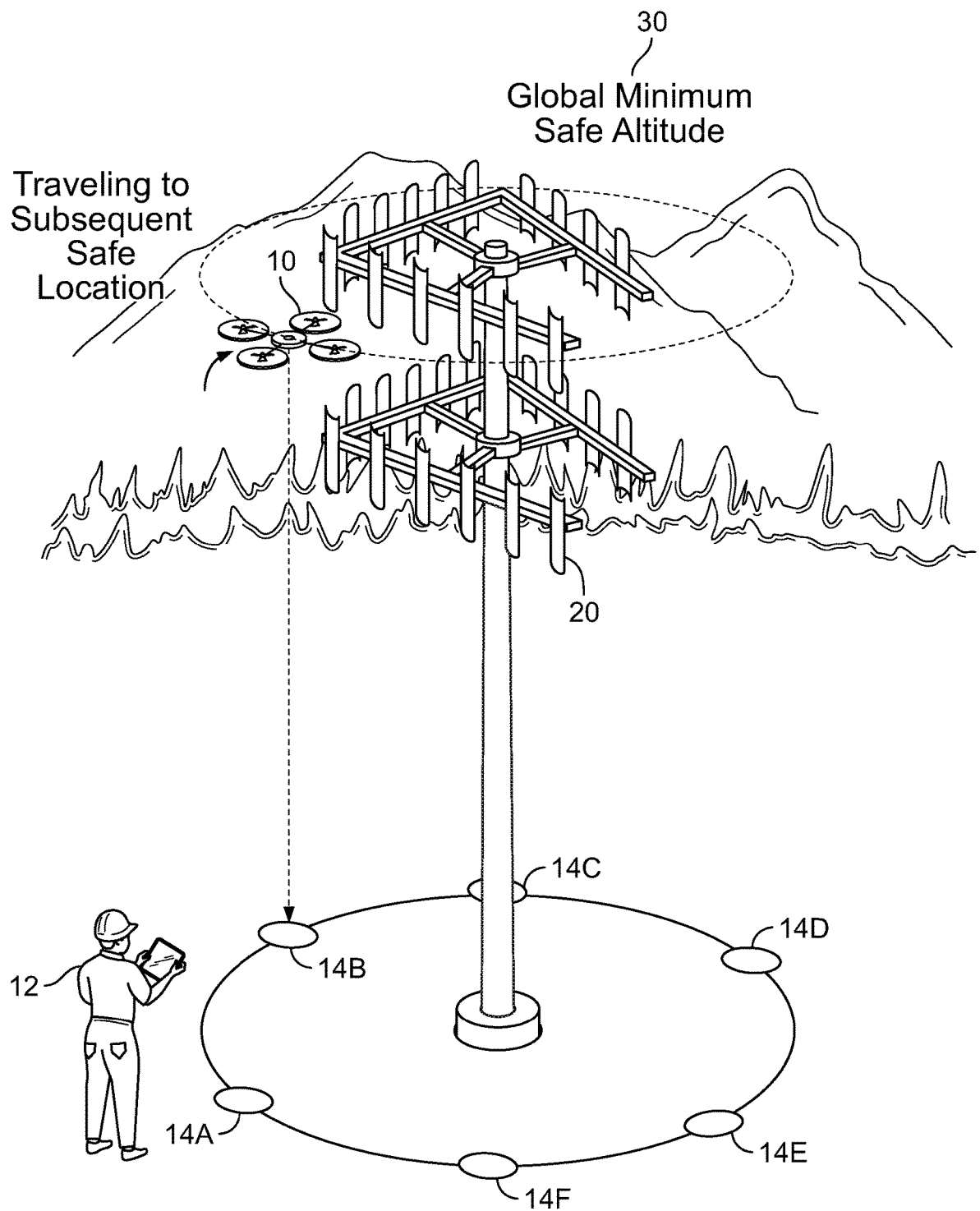
FIG. 1C illustrates an example of the UAV traveling to a subsequent safe location at the global minimum safe altitude.

FIG. 1C illustrates an example of the UAV 10 traveling to a subsequent safe location 14B at the global minimum safe altitude 30. Since the global minimum safe altitude 30 indicates an altitude that provides the UAV 10 with freedom of travel, the UAV 10 ascends to the altitude 30, and moves to the subsequent safe location 14B.

As described above, the UAV can then descend to a minimum threshold above the ground, and selectively activate one or more sensors, to obtain real world information 16. As will be described below, upon completion of the vertical inspection, the UAV can provide the real world information 16 to the user device of the operator 12, or to a cloud system in communication with the UAV (e.g., using a wireless connection such as a 4G, LTE, Wi-Fi, connection). In some implementations, the real-world information can be provided, for presentation, to the operator 12 as the UAV obtains it (e.g., the operator can view images taken by the UAV in substantially real-time).

Figure 1D:
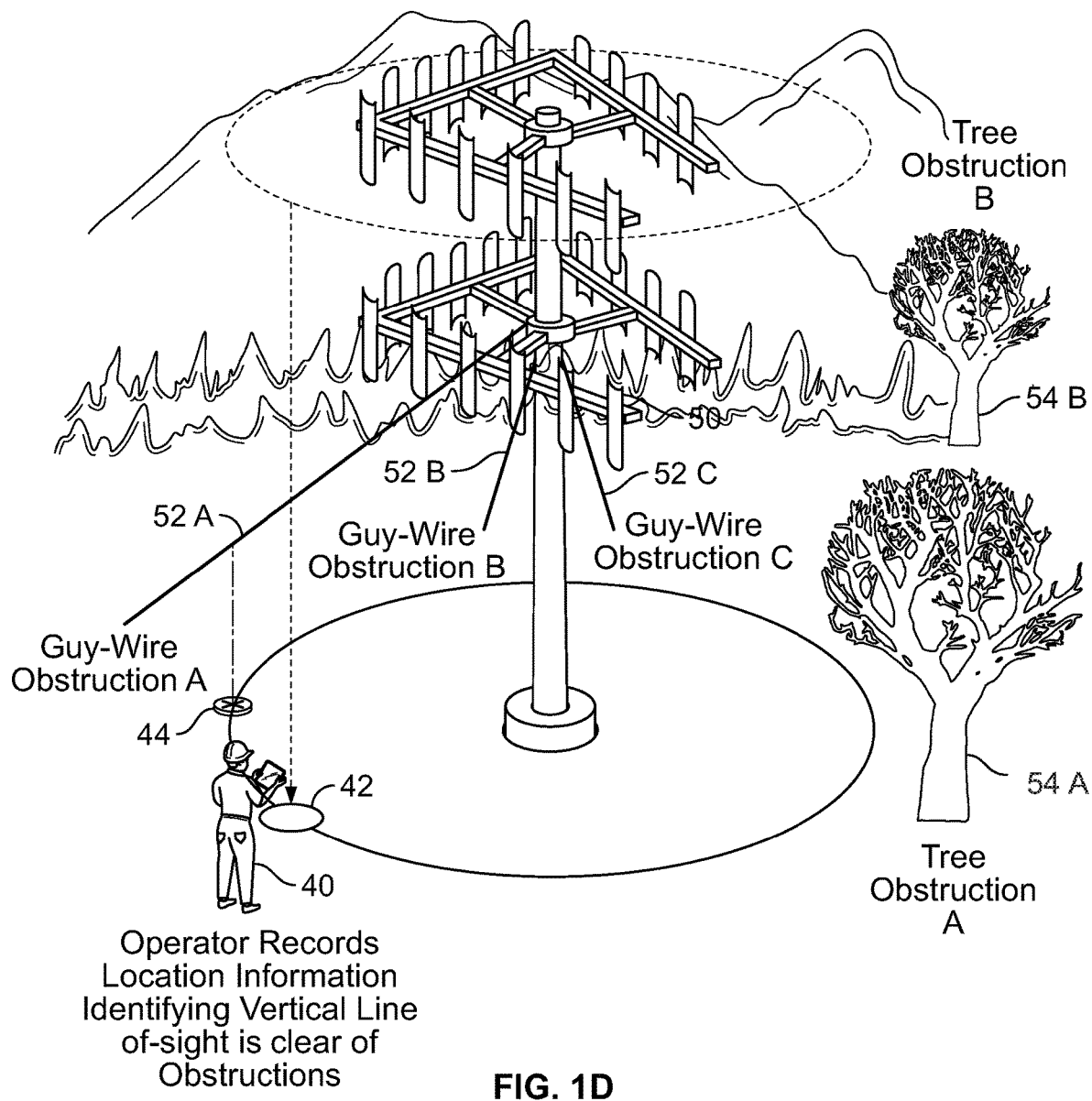
FIG. 1D illustrates an example of an operator indicating safe locations for a UAV to perform a vertical inspection of a structure.

FIG. 1D illustrates an operator 40 indicating safe locations (also referred to as a vertical inspection location) for a UAV to perform a vertical inspection of a structure 50. As illustrated, the structure 50 has adjacent obstructions that can interfere with a UAV's ability to safely ascend and descend. For instance, the structure 40 is secured to the ground with several guy-wires (e.g., guy-wires 52A-52C), and has adjacent trees (e.g., tree obstructions 54A-54B). The operator 40 can travel (e.g., walk) around the structure 50, and indicate safe locations that are free of obstructions in a vertical direction. In some implementations, the operator 40 can prefer to be a threshold distance away from the structure 50 when determining safe locations (e.g., 5 meters, 7 meters, 12 meters), and can indicate safe locations surrounding the structure 50 at the same threshold distance.

For instance, the operator 40 has traveled to location 42, and has verified that in a vertical line-of-sight above the location 42, there are no obstructions that can interfere with the safe operation of the UAV. The operator 40 can then interact with a user device (e.g., laptop, mobile device, accurate GPS device such as a Carrier-Phase Enhanced GPS) to obtain information identifying the location 42 (e.g., GPS coordinates). Optionally, the operator 40 can interact with the UAV (e.g., a UAV that includes a GPS receiver) to record information identifying the location 42. The UAV can maintain the safe locations for use when performing the vertical inspection (e.g., as illustrated in FIGS. 1A-1C). Similarly, the operator's 40 user device can be in communication with the UAV, and the operator 40 can place the UAV at the safe location 42, indicate that the location is safe in software executing on the user device, and the user device can obtain location information from the placed UAV.

After recording information identifying the safe location 42, the operator 40 can travel to a different location, and determine whether obstructions exist. As will be described below, the operator 40 can indicate a number of safe locations surrounding the structure 50 such that the entirety of the structure 50 can be safely inspected. Since the number of safe locations may depend on a size of the structure 50 (e.g., a footprint of the structure), the operator's 50 user device can determine a minimum number of safe locations necessary or desirable to perform the inspection. For instance, the user device can obtain satellite imagery of the structure, and determine a size of the structure (e.g., footprint). Furthermore, the number of safe locations can be modified depending on functionality of a UAV to be utilized. For instance, different camera and other sensor capabilities might require more or less safe locations.

In the example of FIG. 1D, the operator has determined that location 44 is not safe. Guy-wire 52A exists in a vertical line-of-sight from location 44, which might interfere with the safe operation of a UAV. Therefore, the operator can move to a different location the same threshold distance from the structure 50, and identify a subsequent safe location (e.g., by activating a safe location control on the user device). In some implementations, the operator's user device can inform the operator 40 if the operator 40 has moved too far, which can cause a hole in the inspection of the structure 50. In these implementations, the operator 50 can then move back and attempt to identify a safe location.

Figure 2:
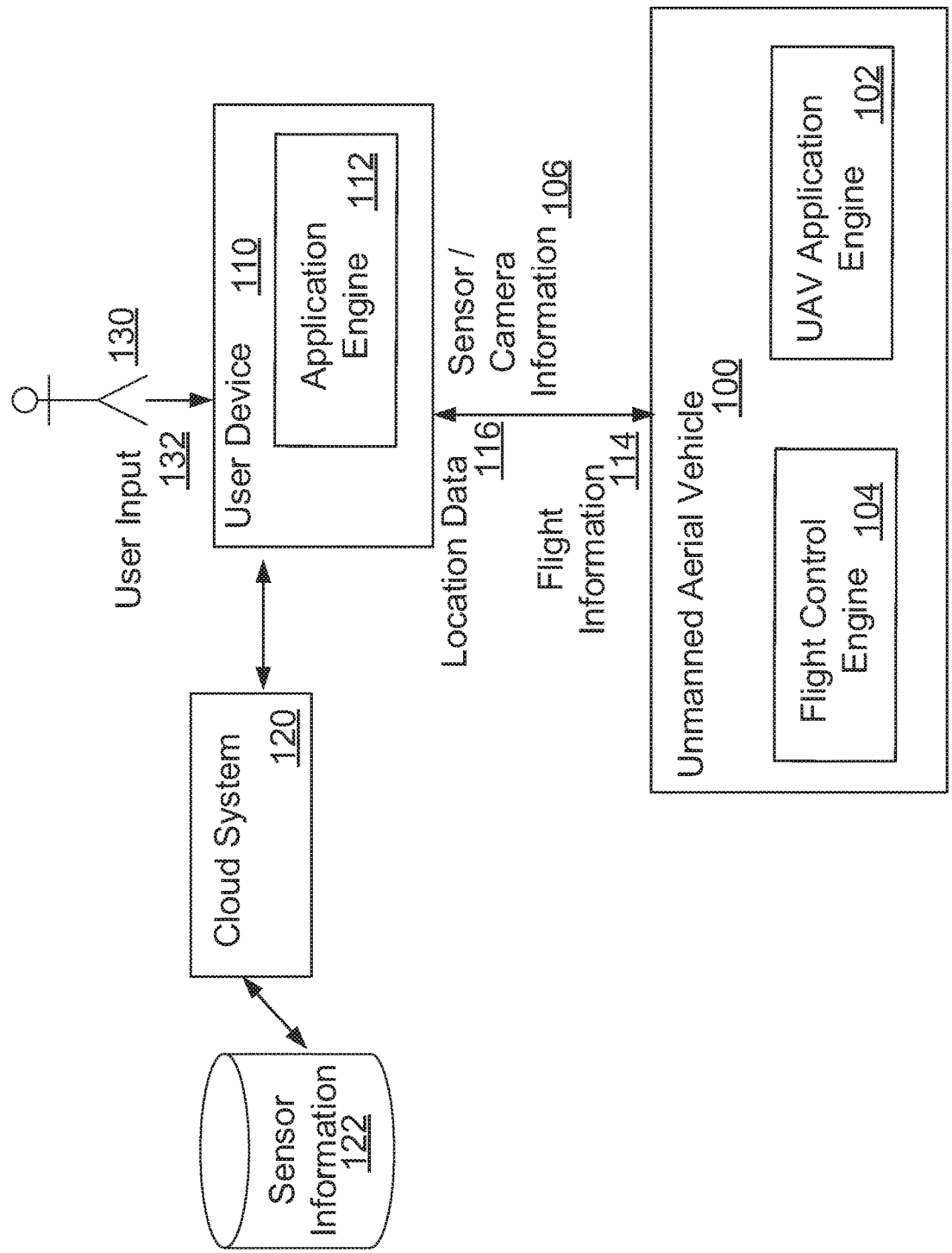
FIG. 2 is a block diagram of example systems utilized in a vertical inspection of a structure.

FIG. 2 is a block diagram of example systems utilized in a vertical inspection of a structure. In this example, the block diagram includes a user device 110 in communication with an Unmanned Aerial Vehicle (UAV) 100 and a cloud system 120 (e.g., a system of one or more computers connected with the user device 110 over a network). As described above, the user device 110 can determine flight information 114 describing a flight plan, and the UAV 100 can perform a vertical inspection in accordance with the flight plan.

The user device 110 includes an application engine 112 that can receive user input 132 from a user 130 (e.g., an operator) specifying flight information 114 (although optionally the application engine 112 may be hosted by the cloud system 120 and accessed by the user device 110 via a browser or otherwise). The application engine 112 can be obtained from an electronic application store, which provides various applications that each enable a UAV to perform specific functionality (vertical inspections, rooftop damage inspections, and so on). The user 130 can direct his/her user device 110 to obtain (e.g., download) the application engine 112.

The application engine 112 can generate user interfaces for presentation to the user 130 that enable the user 130 to specify flight information 114. For instance, the application engine 112 can generate interactive documents (e.g., web pages) for presentation on the user device 110 (e.g., in a web browser executing on the user device), or the application engine 112 can generate user interfaces to be presented in an application window. For instance, the user 130 can specify information describing safe locations (e.g., location information, which can include location data 116 from the UAV 100 as described in FIG. 1D), along with height intervals at which a UAV is to obtain sensor, camera, information of a structure. Optionally, the application engine 112 can obtain configuration information of the UAV 100 to be flown, and determine what sensors are included in the UAV 100. The application engine 112 can then provide a recommendation regarding height intervals to the user 130 (e.g., based on capabilities of the camera, including aperture, focal length, resolution, and so on). Additionally, the user 130 can enter height information of the structure, location information identifying a center of the structure (e.g., from satellite imagery, map data, structure blueprints, or otherwise), and location information identifying safe take-off/landing points (e.g., the application engine 112 can assume that an initial safe location is a take-off point, and a last safe location is a landing point). Furthermore, the user 130 can enter a radius of a circular geofence centered at the structure (e.g. as described above), and a global minimum safe altitude within the geofence.

In the case of antenna structure inspection, the user device may obtain information about an antenna structure registration for the relevant country of inspection. In the United States for example, antenna structures are registered with the Federal Communications Commission, and can be searched at www.fcc.gov. The user device may query a database, or receive from a cloud system, information for a particular Antenna Structure Registration Number. Typically, the registered antenna structure will have associated latitude/longitude coordinates, elevation of the site above mean sea level, overall height above mean sea level (AMSL), overall height above ground (AGL), and overall height above ground w/o appurtenances. An initial geofence may be determined by the user device, or by a cloud system and transmitted to the user device for an antenna structure using the associated latitude/longitude coordinates. The geofence then can be resized as needed by the operator of the user device. The overall all height above ground w/o appurtenances, or the overall height above ground may be used to set an initial maximum height for the UAV's inspection of the antenna structure. Additionally, during an inspection, the UAV can confirm the height above ground to ensure that the actual height of the antenna structure with appurtenances conforms with the registered antenna structure information.

After receiving the above-specified information, the application engine 112 can generate flight information 114, and provide the flight information 114 to the UAV 100. The UAV includes a UAV application engine 102 that can receive the flight information 114, and enforce the constraints and information entered by the user 130. An operator can place the UAV 100 near the structure at, or near, the safe take-off location, and the application engine 102 can bring about the specified flight plan. For instance, the application engine 102 can direct the UAV to travel to safe locations, ascend/descend, and so on. Optionally, the application engine 102 can be in communication with a flight control engine 104 that maintains the UAV 100 within the specified geofence, and controls the movement of the UAV. The application engine 102 can direct the UAV 100 to activate included sensors, (e.g., the application engine 114 can include drivers associated with the sensors and cameras), and the application engine 102 can control a gimbal associated with each camera (e.g., to maintain the camera being pointed at the center of the structure) and/or other sensor.

Optionally, during the UAV's 100 flight, the UAV 100 can provide sensor information 106 (e.g., sensor measurements, camera images, along with associated metadata) to the user device 100 (e.g., in substantially real-time) for the user 130 to review. Metadata can include an identification of each camera image, or other sensor measurement, an estimated position and attitude of the UAV at the time of capture (e.g. activation of the camera) determined using an Inertial Navigation System (INS) included in the UAV, gimbal information (e.g., gimbal attitude at the time of capture), and so on. Optionally, the UAV 100 can provide sensor/camera information 106 upon completion of the vertical inspection. The user device 100 can then provide the received sensor/camera information 106 to a cloud system 120 for storage (e.g., in one or more databases 122, or a storage system in communication with the cloud system 120).

For a conducted flight plan, the interface of the user device may display the UAV moving along the pre-planned flight path. While in flight, the UAV may transmit its geo-spatial location to the user device. Also, the UAV may also transmit information to the user device indicating that a photograph has been taken, and the coordinates of the photograph. The UAV may also transmit a thumb-nail image of the photograph to the UAV. The interface of the user device then may display a user affordance, such as an icon, or the thumb-nail image, representing a location where the image was taken. Also, the UAV may be optionally configured to transmit in real-time the images to the user device.

Optionally, the cloud system 120, or the user device 100, can generate information associated with the received sensor information, including a 3D model of the vertical structure, a 3D point cloud, digital surface model, surface mesh, and so on. The generated 3D models can be utilized in subsequent vertical inspections (e.g., to identify obstructions, determine safe locations, and automate the inspection process).

Figure 3:
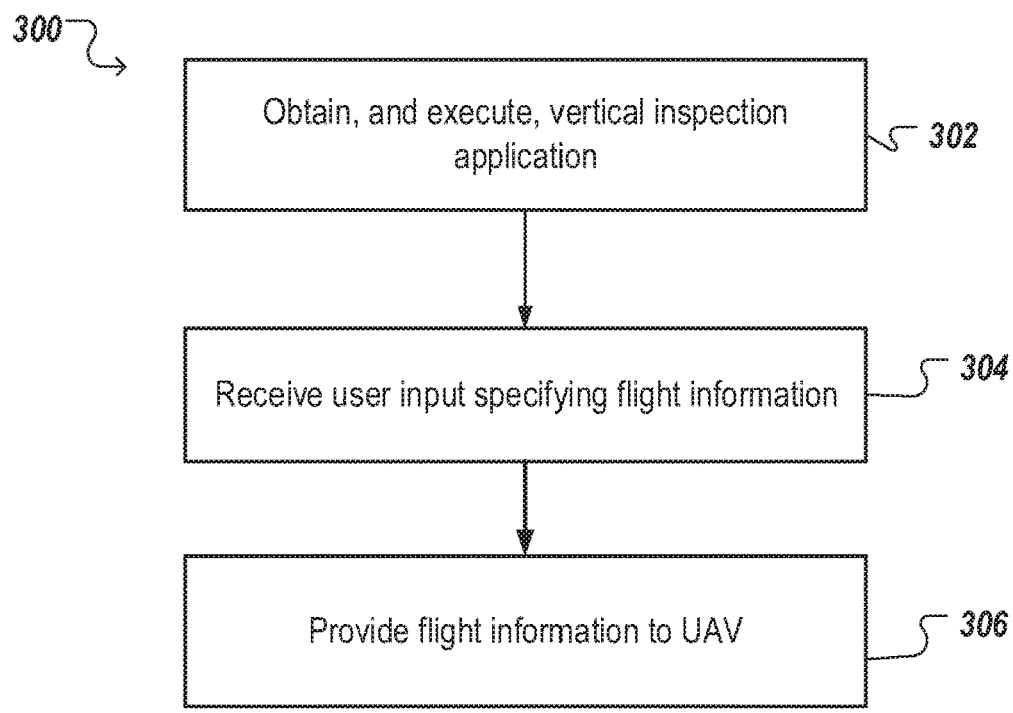
FIG. 3 is a flowchart of an example process for generating a flight plan describing a vertical inspection of a structure.

FIG. 3 is a flowchart of an example process for generating a flight plan describing a vertical inspection of a structure. For convenience, the process 300 will be described as being performed by a system of one or more processors (e.g., the user device 110).

The user device obtains, and executes, a vertical inspection application (block 302). As described above, the user device can access an application store (e.g., maintained by a company that enables UAVs to perform specific functionality). The user device can receive an application specific, or that includes functionality, to enable vertical inspections (e.g., a user of the user device can select a vertical inspection application from a list of applications, and receive the application). After obtaining the vertical inspection application, the user device executes the application and, using configuration information of a UAV to be utilized, the user device can obtain other needed or desirable software or executable code to implement the vertical inspection (e.g., drivers associated with cameras included in the UAV, and so on). In this way, the user of the user device can swap a different camera into the UAV, and the vertical inspection application can obtain drivers for the different camera.

The user device receives input specifying flight information for the vertical inspection (block 304). The user device can generate user interfaces for presentation to the user of the user device, with the user interfaces including selectable areas to enter information associated with the vertical inspection. Additionally, as described above, location information identifying safe locations can be obtained from the UAV, another user device (e.g., a mobile device), an accurate GPS such as a Carrier-Phase Enhanced GPS, and automatically included in the user interfaces.

For instance, the user device can receive information describing safe locations (e.g., locations in which a UAV can safely ascend/descend in a vertical line from a global minimum safe altitude to the ground, as illustrated in FIG. 1A). The user of the user device can walk around a vertical structure (e.g., a threshold distance from the structure such as 5 meters, 7 meters, 10 meters, or a distance that depends on the configuration information of the UAV or height/footprint of the structure), and identify safe locations by activating a corresponding control on the user device. The user device stores in memory, the safe location represented by latitudinal and longitudinal coordinates, or a radius length from a centroid of the structure and a radial degree, or other information representing the safe location.

Optionally, the user can place the UAV at a safe location, and interact with the user device (e.g., activate a safe location control) to record a location as determined by the UAV (e.g., the UAV can obtain GPS coordinates), which provides the coordinates to the user device for storage. Also, the user may place the UAV, for example on the ground, and the UAV may determine that motion of the UAV has stopped by referring to onboard accelerometers. The UAV may then record its position and then store the position in onboard non-volatile memory. Additionally, after the UAV is placed on the ground, the UAV may use a timer where the UAV waits for a predetermined period of time before obtaining its positional information.

Figure 6:
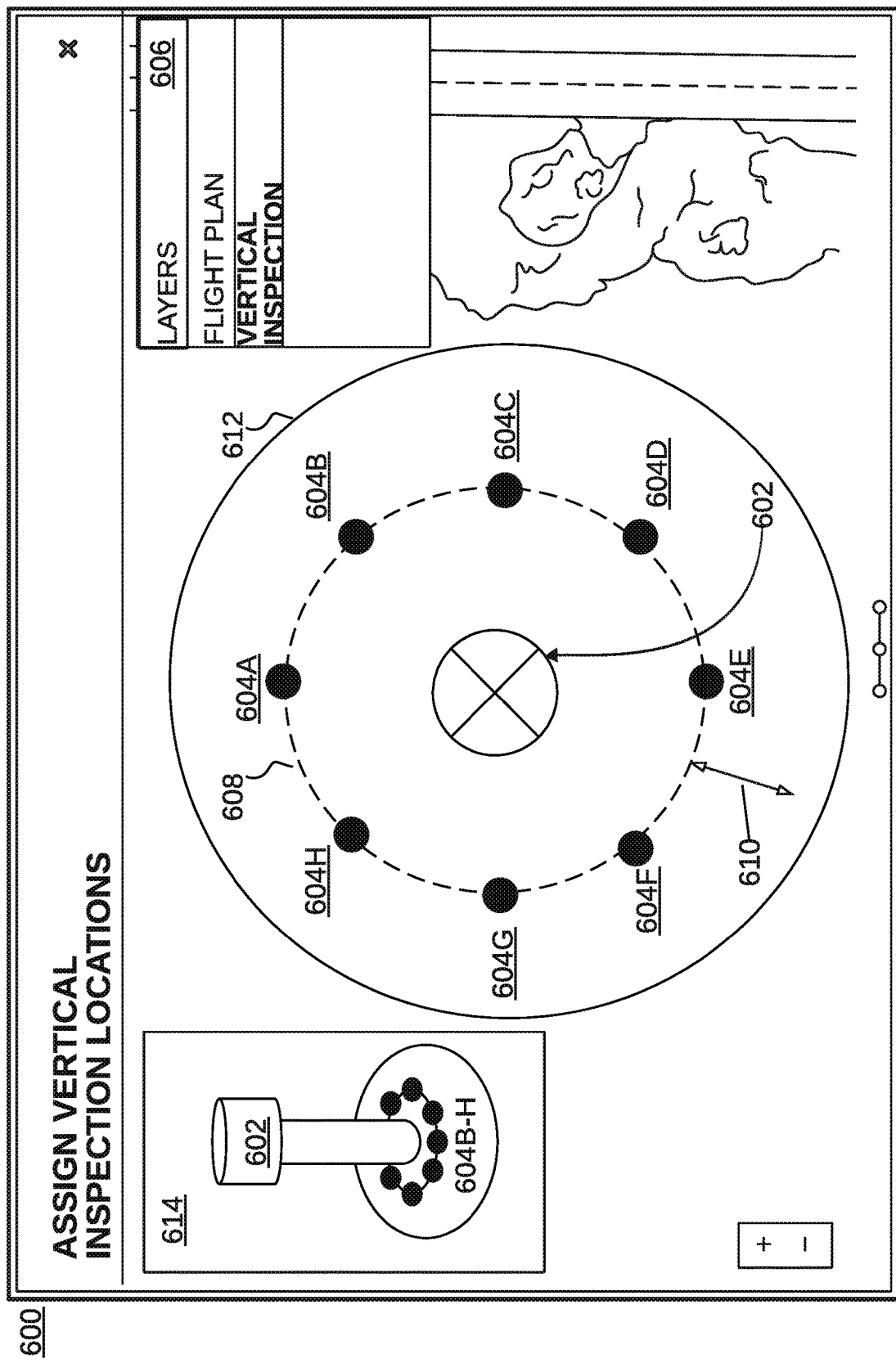
FIG. 6 illustrates an example interface for defining vertical inspection locations.

Referring to FIG. 6 an example user device interface 60 is shown. Optionally, an interface of the user device may present an aerial image of the structure, or other representation of the structure, such as a 3D CAD drawing. The interface may present proposed safe locations (604A-604H) for the vertical columns of flight by the UAV. The interface may display an inspection perimeter, for example a circular ring 608, or other shape around the structure 602 presented in the image. The vertical inspection perimeter 608 may be adjusted to increase, or decrease the radius or distance of the inspection perimeter around the structure 602. Additionally, vertical inspection locations (604A-604H) may be displayed about the inspection perimeter. A vertical inspection location can be represented with by a waypoint having a geospatial position, for example, with latitude/longitude coordinates, and optionally an altitude for the waypoint. For each vertical inspection location, the UAV will perform a vertical inspection at the waypoint. For example, waypoints for safe locations (604A-604H) may be displayed via the user interface about the inspection perimeter. Additional vertical inspection locations may be added, or removed. The interface allows a user to drag and move around a vertical inspection around the perimeter. In one embodiment, the vertical inspection location may be moved along the displayed inspection perimeter. The size of the perimeter may have a minimum distance, and/or a maximum distance. For example, the smallest radial size of the inspection perimeter would be limited to the minimum distance, for example 3 meters. Likewise, the maximum distance would be limited to the maximum distance, for example 20 meters. Effectively, this provides a variable distance range for the inspection perimeter, from 3-20 meters around the structure. As the inspection perimeter 608 increases in size (as shown by arrow 610), additional vertical inspection locations may be automatically added to the inspection perimeter, and as the inspection perimeter decreases in size (as shown by arrow 610), vertical inspection locations may be automatically removed. The remaining vertical inspection locations may automatically be spaced so that they are equidistant from one another around the inspection perimeter.

While the vertical inspection locations (604A-604H) are discussed as being placed equidistant from the center of the structure 602, they may also be placed in other locations. Also, while the interface is discussed using a user device, a similar interface may be used for a cloud system.

Optionally, using the safe location information the user device can determine a geofence envelope 612 (e.g., a 2D or 3D virtual perimeter for a real-world area or volume that limits locations of the UAV to real-world locations in the geofence) that includes each safe location (604A-604H). A UI panel 614 inset in the main user interface 600 may depict a 3-dimensional view of the structure 602 to be inspected, and display the vertical inspection locations, and the geofence envelope. Additionally, a geofence envelope may be placed around, or above the top of the primary structure 602 to prevent a UAV from flying too close to antenna, or other structures or devices on top of the primary structure. Additionally, information such as heights and altitudes may be displayed in the interface 600 of the primary structure 602. The geofence envelope can therefore be a substantially circular geofence 612 centered at the structure, which forces the UAV to maintain itself within the threshold distance (e.g., as described above) from the structure. The geofence may be other shapes, for example an oval, rectangle, sphere, cylinder, or other shape. The user device may have collected a number of safe locations around the perimeter of the structure to be analyzed. The user device may then determine a geofence envelope 612 that surrounds the safe locations (604A-604H). Similar to the inspection perimeter, the geofence may be increased or decreased in size. The geofence may be created with a predetermined distance from each of the safe locations, such as 10 meters. The UAV can then be constrained for flight operations only within the geofence envelope. For both autonomous UAV flight operations, and manually controlled flight operations, the UAV would be limited to flight within the geofence envelope. Additionally, similar to creating the safe locations using the user device or the UAV, geofence boundary locations may be created. The user may capture geofence boundary locations around the safe locations using the user device or ground placement of the UAV. The user device, or the UAV, may then use these geofence boundary locations to create the geofence envelope.

The user device can receive information identifying height intervals indicating a vertical distance to be traveled by the UAV before activating sensors, and/or cameras. In some implementations, the height interval can be a default value, or in some implementations, the user can select from among several default values. As described above, the height interval can depend on the capabilities of the sensors included in the UAV (e.g., the user device can obtain configuration information describing the UAV). For instance, a particular camera with a high resolution sensor (e.g., a 42 megapixel backside illuminated sensor), configured with a lens which can resolve the high resolution with a wide focal length, can have a larger height interval than a low quality sensor and lens which can merely accurately resolve a smaller area of the image (e.g., the center of the image). The user device can determine one or more height intervals for the UAV, and the user device can receive a selection of a particular height interval from the user.

The user device can receive information describing the vertical structure, such as location information (e.g., the user can capture GPS coordinates of the structure, or the user can obtain coordinates from geo-rectified imagery), height information of the structure, and location information identifying a center of the structure. To determine the center of the structure, optionally the user device can compute the center of a circle sketched out by the safe locations (e.g., the safe locations are all a threshold distance from the structure). The safe locations may be at different distances from the structure, and the user can obtain additional locations (e.g., all a same distance from the structure), and the user device can determine a center.

The user device can receive location information (GPS coordinates) identifying safe take-off and safe landing locations. As described above, in some implementations the user device can indicate, or recommend to the user, the take-off location as an initially entered safe location (e.g., as described above), and the landing location as a subsequent safe location (e.g., a final entered safe location). Optionally, the user device can receive uniquely indicated take-off and landing locations.

Additionally, the user device can receive a global minimum safe altitude indicating an altitude at, or above, which no obstructions exist and the UAV can travel freely within the geofence. For instance, the user can indicate the global minimum safe altitude as being a threshold distance above the height of the structure (e.g., one meter, two meters, and so on). Optionally, the global minimum safe altitude can be a range of values, for instance, the range can begin a threshold distance above the structure, and end a threshold distance below a higher obstruction (e.g., the roof of a freeway). Similarly, optionally the global minimum safe altitude can be a 3D geofence describing a volume of space that is indicated as safe for travel. For instance, the user device can receive a 3D model of the structure, and determine allowable locations for the UAV to travel.

Optionally, the user device can determine whether weather will negatively affect the vertical inspection. For instance, the user device can receive information identifying a start time of the inspection, and obtain information over a network describing weather for that time period from an online weather service. The user device can then recommend alternate times if the weather will negatively affect the vertical inspection. For example, the user device can determine that the weather will be cloudy, rainy, and so on, and that one or more of the sensors included in the UAV will be negatively affected. Furthermore, the user device can determine locations of the sun during the vertical inspection, and based on the locations, can determine whether the sun will be pointed at the one or more of the sensors of the UAV (e.g., the bright light of the sun can cause clipping in the image) based on the start time of the inspection, safe locations, and location information of the structure. The user device can recommend alternate times, or recommend a particular order for the UAV to travel to each safe location.

The user device provides flight information to the UAV (block 306). The user device can be in communication with the UAV (e.g., an application executing on the UAV), and can provide the flight information described above to the UAV for storage.

After receiving the flight information (e.g., over a wired or wireless connection), the UAV can begin the vertical inspection. Optionally, the UAV can determine its present location, and if the present location is the safe take-off location, can begin the vertical inspection (e.g., after receiving a request from the user device).

Figure 4:
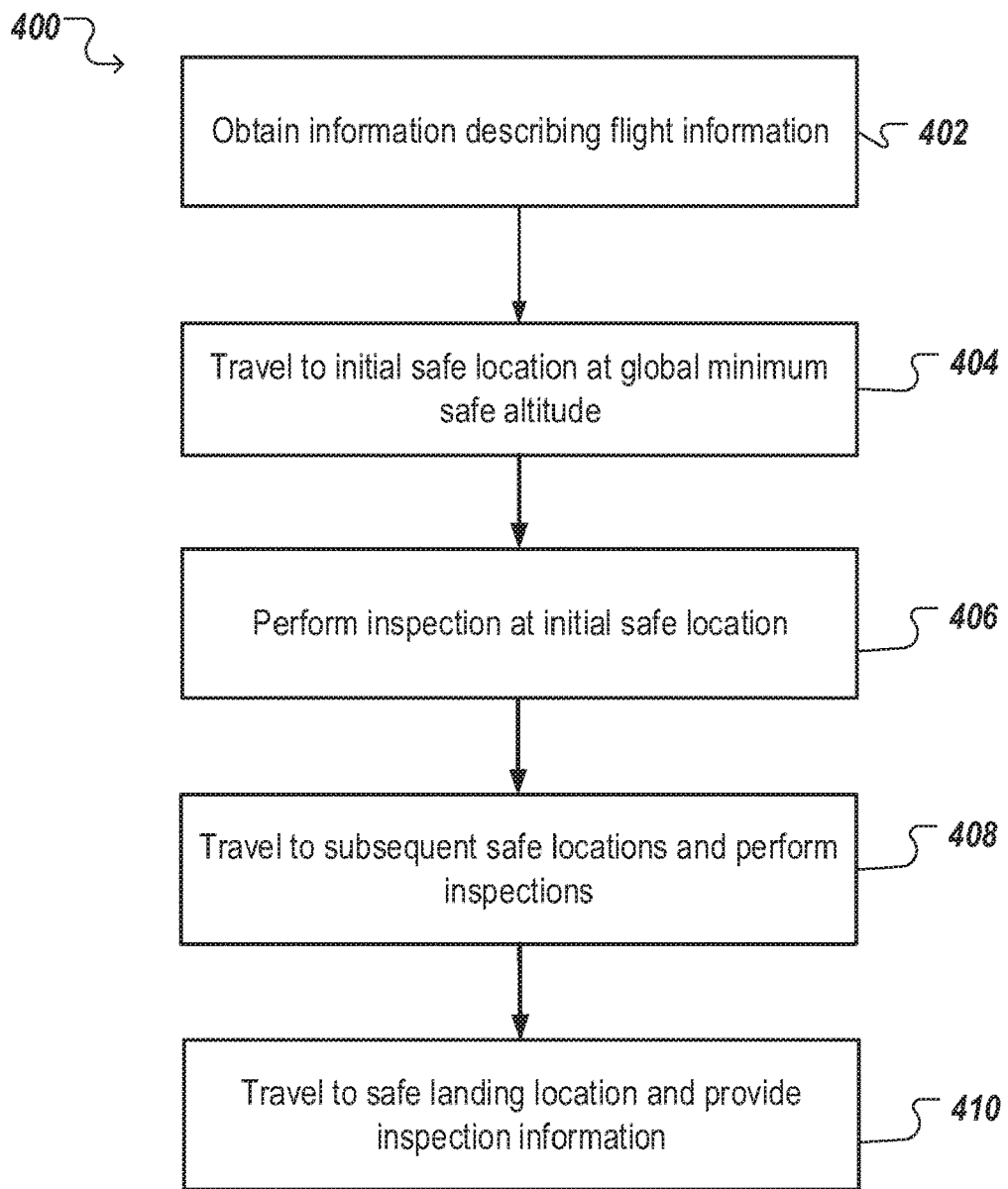
FIG. 4 is a flowchart of an example process for performing a vertical inspection.

FIG. 4 is a flowchart of an example process 400 for performing a vertical inspection. For convenience, the process 400 will be described as being performed by a system of one or more processors (e.g., the Unmanned Aerial Vehicle 100).

The Unmanned Aerial Vehicle (UAV) obtains flight information describing a vertical inspection flight operation (block 402). As described in FIG. 3, the user device can receive information describing a flight operation, and can provide the flight information to the UAV.

The UAV travels to an initial safe location (block 404). An operator located near the UAV (e.g., as illustrated in FIG. 1A) can place the UAV at the initial safe location, or at a safe take-off location. The operator begins the inspection when the user device receives a start inspection input. In response, the user device submits a command to the UAV to begin an auto-piloted inspection. During the inspection, the operator may pause, unpause, or abort the inspection with the user device. Also the operator may take full control of the UAV, and operate the UAV in a manual mode. The user device pause command temporarily suspends the progress of the inspection, leaving the UAV hovering in its current position. The user device unpause command instructs the UAV to resume the inspection from the current position. If the operator enters an abort input, the user device transmits a command to the UAV, and in response the UAV will immediately climb to the global minimum safe altitude, fly to a pre-determined landing zone, and land immediately.

While the UAV computer system autopilot module is navigating the UAV for the inspection, certain aspects of the flight pattern may be controlled by the operator's user device. For example, while the UAV is performing an inspection of a structure, the UAV would be ascending and/or descending while obtaining sensor information describing the structure, for example triggering a camera to obtain digital images. The flight plan or pattern may be configured such that for a particular safe location (i.e., vertical inspection location) vertical ascent/descent rate, UAV altitude, horizontal UAV rotation, payload gimble, payload direction, or trigger a payload sensor may be controlled by the operator. The user device may have a physical control such as a toggle or joystick, or a user interface control, that allows the user to control vertical ascent/descent rate, UAV altitude, UAV attitude, horizontal UAV rotation, payload gimbal, payload direction, or trigger a payload sensor while conducting the inspection. For example, the UAV may navigate via autopilot to a position over, or at a safe location, and the operator then can provide input to the user device, and the user device may transmit a signal or information corresponding to the user input, to the UAV (via radio communication) to control the vertical ascent/descent rate, UAV altitude, UAV attitude, horizontal UAV rotation, payload gimbal, or payload direction, or trigger a payload sensor. This particular mode allows for partial auto-pilot control, and operator control of the UAV. In this case, the UAV automatically via autopilot moves from safe location to safe location, but the operator has the ability to control only the vertical ascent/descent rate, and the altitude. However, even though the operator may control the vertical ascent/descent rate, the UAV still may enforce the highest altitude, and the lowest altitude the UAV may fly to. Additionally, the operator may choose to hold the position of the UAV in the vertical column, and manually trigger one or more sensors of the UAV. The user device may receive an input indicating that the UAV should move to the next safe location (or could receive an input to move to a previous safe location). In this case, the UAV will then resume autopilot mode and move over the next safe location to perform a vertical inspection. The inspection may continue in an autopilot mode, or may again be partially manually controlled by the operator using the user device. Additionally, the UAV may receive a command from the user device to nudge the UAV in a particular direction. In this case, the control input of the user device, allows for sending a command to the UAV to move slightly, for example between 0.1 and 3 meters, in a particular direction (in an x, y, or z axis, or diagonally). The particular distance can be predetermined, or be variable based on the proximity to the structure. Nudging the UAV, allows the operator to move the UAV away from the structure if the operator sees that the UAV flying too close to the structure. The nudge command may be provided any time to the UAV while it is operating in an auto-piloted mode. However, the UAV should still enforce geofence boundaries and not allow a nudge to cause the UAV to move beyond across a geofence boundary envelope.

The UAV operating system may automatically nudge the UAV to maintain a fixed distance from the structure. For example, the UAV may use a camera with a particular focal length lens. The camera may need to stay a particular distance from the structure so that the camera will be in focus when taking a picture. This is particularly true if the camera lens does not use autofocusing functionality. The UAV computer operating system may receive a focal length distance value for the UAV to take images of a structure. This value may be associated with a particular waypoint, or a general value used for any image taken.

An application engine, or module, running on the primary or secondary UAV operating system commands the UAV to ascend to a minimum altitude above the ground and travel (e.g., fly) until reaching an initial safe location, as described above, and ascends to the global minimum safe altitude. The UAV can obtain the location information identifying the initial safe location (e.g., latitude/longitude), and compare the initial safe location to its present location (e.g., determined using a GPS receiver). Once reaching the global minimum safe altitude for the initial safe location, the UAV descends and performs the vertical inspection.

The UAV performs an inspection at the initial safe location (block 406). As illustrated in FIG. 1A, the UAV descends from the global minimum safe altitude towards the ground (e.g., a surface on which the structure is located).

As the UAV descends, the UAV maintains a portion (e.g., front) of it towards the center of the structure. For instance, the UAV can include a magnetometer, and using the location information of the center of the structure and the present location of the UAV, can determine a direction the portion is to be pointed at (e.g., using the determined magnetic direction). Optionally, the UAV can provide additional refinements to readings from the magnetometer. For instance, the UAV can utilize information from a LiDAR sensor (e.g., a sensing technology that utilizes lasers to determine distance) to determine boundaries of the structure (e.g., the UAV, or a gimbal that includes the LiDAR sensor can move back and forth to determine the horizontal boundaries). The UAV can then determine the center of the structure, and point the portion at the center. Optionally, a beacon (e.g., visual identifier (e.g., an active beacon, such as one including a light emitting device or passive beacon, such as a reflector), or a beacon that outputs a signal recognizable to the UAV) can be placed on the structure. The UAV can then utilize the beacon to maintain the portion pointed at the structure. In this way, the UAV can ensure that images, and other sensor data, can include a same perspective of the structure.

Additionally, as the UAV descends it ensures that it maintains a constant (e.g., within a threshold) distance from the structure. For instance, as described above the safe locations can be a threshold distance from the structure (e.g., 6 meters, 7 meters, 10 meters). Using a LiDAR sensor in a feedback loop, the UAV can make corrections to its descending flight path to maintain the constant distance. Additionally, the UAV can provide corrections with stereo imagery (e.g., the UAV can determine that the structure encompasses a same area of the stereo images, or the UAV can determine that it's looking at the structure using visual classifiers).

The UAV activates one or more sensors according to the height intervals received in the flight information. As the UAV descends, it provides instructions to some or all of the sensors to take measurements and images. The UAV stores metadata associated with the activations. For instance, the UAV may uniquely identify each measurement and image, and may store a timestamp associated with each measurement and image, a geospatial position, barometric altitude, or vertical distance above the ground. The UAV may additionally obtain estimated position information from an included Inertial Navigation System (INS), and estimated attitude information from the INS. Additionally, the UAV may obtain gimbal attitude information associated with each sensor and camera. Since, as described above, gimbals can be moved to maintain one or more of the sensors pointed at the center of the structure, the gimbal attitude information can be used to describe each camera's and/or other sensor's location in a coordinate frame. As will be described below, the position/attitude information of the UAV and attitude information of the gimbal, will be used to reconstruct the position and attitude of each camera and sensor (e.g., to be used when generating 3D models of the structure).

The UAV may have an onboard illumination system to light areas of a structure being inspected. For example, the lighting system may help illuminate areas that have darkened areas or shadows. The UAV may activate the lighting when ascending or descending and capture sensor data. The UAV may use different light frequencies based on a particular type of inspection. The lighting may be automatically operated based on an optical sensor reading of the structure. If, for example, the UAV detects a threshold value indicating a dark area, shading or shadows, the UAV may turn on the lighting to illuminate the particular area of the structure. If the lighting is powered from the UAV power system, turning the illumination system on when needed will conserve battery power, and provide a longer flight time for the UAV. Moreover, an onboard illumination system may be activated depending on the time of day, and the position of the UAV relative to the structure being inspected. For example, the structure may be a pole tower supporting antenna structures. The pole tower may cast a shadow during certain times of the day during daylight hours. The UAV may automatically activate the illumination system when the UAV is physically located in a position behind the structure relative to the sun. The UAV computer system may determine that it is located in a shadowed position, and activate the lighting to inspect the shadowed area. Additionally, the UAV computer system may automatically activate the illumination system based on the time of day, or using an optical sensor to determine that ambient lighting is not sufficient to obtain clear or useable sensor data.

To determine height information of the UAV, and thus to determine times at which to activate the sensors, and cameras, the UAV may obtain barometer readings describing estimated heights. Optionally, in addition or instead, the UAV can utilize other sensors, including LiDAR, for use in accurately determining a present height of the UAV.

The UAV descends until it reaches a threshold distance above the ground, and then begins to ascend back to the global minimum safe altitude. Optionally, to ensure that the UAV inspects the entirety of the external, visible, portions of the structure, the sensors, and cameras, can be pointed upwards at a particular angle (the associated gimbals can be pointed upwards at 30 degrees, 45 degrees). In this way, the UAV can inspect portions of the structure that would otherwise be hidden. One or more cameras may be pointed at a particular angle above the horizontal at the center of the structure, and ascend along the vertical direction while maintaining, using the gimbals, the one or more cameras pointed at a particular angle above the horizontal at the center of the structure, with the particular angle is between 30 and 60 degrees.

After ascending to the global minimum safe altitude, the UAV can descend and ascend another time, to ensure that the desired measurements and images were obtained, or the UAV can travel to a subsequent safe location. Optionally, the UAV can determine whether any sensors or cameras failed to activate during one or more times of the descent or ascent (e.g., by interrogating a camera and determining that the camera did not capture any images during the descent or ascent). The UAV can then descend and ascend at the initial safe location until all desired or commanded measurements and images are obtained. Additionally, as described above the measurements and images can be provided to an operator (e.g., an operator utilizing the user device) for presentation. The operator can indicate that one or more measurements or images were of poor quality (e.g., image was out of focus, there was insufficient light, or the sun caused clipping of the image based on an analysis of a histogram of the image), or were not taken, and the UAV can determine a height interval associated with the poor or missing images (e.g., from metadata of the images or the absence of an image with a timestamp during a certain period of time), and descend back to the height interval to activate the sensors at issue and/or all the sensors.

The UAV travels to subsequent safe locations and performs inspections (block 408). The UAV travels at the global minimum safe altitude between safe locations, and performs inspections as described above.

The UAV travels to the safe landing location and provides the obtained inspection information (block 410). After completion of the inspection, the UAV travels to the safe landing location (e.g., the safe landing location can be the ultimate safe location), and the operator can obtain the stored inspection information. For instance, the operator can connect the user device to the UAV (e.g., using a wired or wireless connection), and the user device can obtain the stored measurements, images, and associated metadata from the UAV.

Once the user device imports the data from the flight, the operator may validate the quality of that. A user interface of the user device may provide viewing of each of the individual images such that the user may visually inspect the images. Also, images may be marked automatically as potentially problematic, for example the user device may perform an analysis of the images and determine that the image is not useable or has poor image characteristics. An image quality score may be assigned to each of the images based on evaluation of the image by evaluating the generated stitched mosaic image for continuity, sufficient overlap, distortion, geographic location error, etc. Also, a composite image quality score may be calculated by the average of all image quality scores, a weighted average of image quality scores, or a minimum/maximum of all image quality scores. The user device may indicate that another structural inspection is necessary if the overall composite score reaches a threshold number, or if there are a predetermined number of images that are potentially problematic.

The user device can then utilize software, such as photogrammetry software that makes measurements from photographs, to reconstruct a 3D model of the structure. The operator can review the received sensor information on one or more user interfaces presented on the operator's user device. For instance, the user device can execute an application that is in communication with the UAV, and can present sensor information to the operator for review. The operator's user device can execute software (e.g., mosaicking software, photogrammetry software) that can combine (e.g., stitch together) the received images, and geo-rectify the images. Additionally, the UAV, or user device, can provide the stored information to a cloud system that can reconstruct the 3D model. The received images can be used to generate a 3D model of the structure (e.g., the user device can generate the 3D model, or the user device can provide the sensor information to the cloud system and receive information describing a 3D model).

Optionally, the operator may place physical visual markers at the identified safe locations. The UAV may have a downward-looking camera, and the UAV computing system may take and analyze periodic images of the visual marker during ascent, or descent, above the visual marker. The UAV computer system may determine that the UAV is centered, or not, above the visual marker. If the UAV is off-center of the visual maker, the computer system may instruct the UAV flight controller to move in a direction(s) to maintain the UAV in a centered position over the marker. Upon traveling to the global minimum safe altitude, the UAV and position over another visual maker at another safe location and begin its descent.

In one implementation, a few recognizable landmarks may be surveyed at the site and the landmarks may be geospatially referenced or tied to the same features in existing geospatial referenced imagery (such as satellite map imagery). This would yield a map that is correctly geo-registered in the local area, and this map could then be used to accurately set the locations of the inspection columns (that is, the safe location, inspection location) and tower center without having to physically place the vehicle at the desired locations.

The UAV may be configured with a downward facing camera whose output is displayed to the user. As the vehicle flies over the site at the safe altitude, and the user device may display the output via an interface. The operation of the device designates the inspection columns by visually verifying it is safe to descend based on the camera output.

After obtaining the 3D model, the operator can utilize the 3D model in subsequent inspections of the structure. For instance, the operator can indicate safe locations from the 3D model (e.g., the 3D model can include locations of obstructions as illustrated in FIG. 1D).

Re-Taking Images

As described above, the UAV, or an operator, can determine that images taken by one or more cameras included in the UAV resulted in poor quality images, or that the cameras never took the images. Depending on a location of the UAV when the above is determined, the UAV can re-take the images to complete the vertical inspection of a structure.

For instance, if the UAV fails to take an image when the UAV is descending at a particular height interval location, and determines that the camera failed to activate prior to again reaching that location during a subsequent ascent, the UAV can re-take the image. If the UAV is past the location, the UAV can descend again to the location and re-take the image.

The UAV's onboard processing system may detect sudden shifts or movement of the UAV, for example due to a sudden gust of wind. The onboard processing system may detect output of UAV accelerometers and/or UAV rotational rate gyros. If a threshold magnitude level is detected when an image, or sensor reading, is taken by the UAV, then the UAV may be configured or programmed to retake the image.

A UAV configured for streaming of images to the user may receive a command from the user device to retake an image. For example, as images are received by the user device, the user device may display the image. Quality information about the image may be determined by various techniques, such as sharpness measurement (e.g. by frequency domain analysis, Laplacian of Gaussian analysis, etc.), sufficient overlap with neighboring images, brightness measurement, exposure measurement, or contrast measurement. The user device may automatically transmit instructions to the UAV to retake an image at a given waypoint if the image fails to meet an image quality threshold. Optionally, the UAV may have onboard GPU processing capabilities. The UAV may after taking an image, move into a holding position, and the UAV onboard processing system may analyze the image. If the onboard processing system determines that an image does not meet a threshold quality, the UAV then retakes another picture. The UAV processing system reruns the image quality review process, and then continues with the flight plan if the image passes the quality threshold.

In another example, the UAV can fail to take the image and determine that the camera failed to activate after completing the inspection of the associated safe location (e.g., the UAV can be traveling to a subsequent safe location, or the UAV can be inspecting a subsequent safe location). The UAV, or the user device, can obtain information describing a geometric model of the field of view of the camera, and determine a field of view of the structure that was missed by the failed image. The UAV, or the user device, can compare the determined field of view with images taken in prior and subsequent height intervals, and determine a hole (e.g., missing field of view of the structure) that would be provided had the image been taken. The UAV, or user device, can then determine that during an inspection of an adjacent safe location, the UAV can tilt (e.g., turn) towards the safe location at the height interval and take an image. The resulting image may show the missing hole of the vertical structure at the height interval, and photogrammetry software can utilize the taken image. Since the perspective will be different, the photogrammetry software can correct for the differing perspective. Additionally, optionally the UAV can travel horizontally at the height interval back to the location at which the camera failed to activate (e.g., travel from the adjacent safe location to the initial safe location at the height interval), take an image, and then travel back to the adjacent safe location to complete the vertical inspection. The operator can indicate on his/her user device that no obstruction exists at that height interval, and that the UAV can safely perform the horizontal movement. Additionally, optionally the UAV can include sensors, and using obstacle avoidance methods can determine (e.g., in real-time as it moves) whether obstructions exist in the horizontal direction.

Additionally, the UAV can travel back to the height interval of the safe location (e.g., after completing the remainder of the safe locations, or after completing an adjacent safe location) to re-take the image.

Optionally, the user device may import data from the flight, the operator may validate the quality of that data before the user device begins stitching the images together. A user interface of the user device may provide viewing of each of the individual images such that the user may visually inspect the images. Also, images may be marked automatically as potentially problematic. An image quality score may be assigned to each of the images based on evaluation of the image by evaluating the generated stitched mosaic image for continuity, sufficient overlap, distortion, geographic location error, etc. Also, a composite image quality score may be calculated by average of all image quality scores, a weighted average of image quality scores, or a minimum/maximum of all image quality scores. The user device may indicate that another photo survey is necessary if the overall composite score reaches a threshold number, or if there are a predetermined number of images that are potentially problematic. The user device may then use photos from the previous flight to generate a quick-stitch of the roof-top.

Global Minimum Safe Altitude

The description above describes the global minimum safe altitude as an altitude at which the UAV can safely travel within the geofence. For some structures, such as a structure beneath a surface (e.g., a column below a freeway or a bridge), the global minimum safe altitude will necessarily have to be less than the height of the structure. As described above, optionally the global minimum safe altitude can be a range of safe altitudes, or a 3D geofence describing a volume of space known to be safe (e.g., determined from a 3D model of the structure and surrounding areas). Therefore, when traveling from a first safe location to a second safe location, the UAV can travel at one or more global minimum safe altitudes. For instance, in the example of a structure beneath a surface, the UAV can travel a threshold distance above the ground (e.g., the safe distance can be one meter above ground). The UAV can travel to the safe location at the threshold distance, descend below the threshold distance, ascend to the top of the structure, descend to the threshold distance and move to a subsequent safe location.

Obstacle Avoidance

The description above includes the global minimum safe altitude and safe locations to provide the UAV with assurances that it will not encounter any obstacles (e.g., the guy-wires illustrated in FIG. 1A can be thin and hard to detect). Optionally, the UAV can include sensors that can determine obstacles during flight. For instance, the UAV can execute one or more visual classifiers that can detect obstacles (e.g., the UAV can recognize objects; the UAV can determine an upcoming obstruction based on an analysis of pixels in images, such as an increasing size of an object, and so on). Additionally, the UAV can utilize sensors (e.g., LiDAR sensors, Leddar or Sonar) to detect that the UAV is approaching an object (e.g., a roof or other ceiling). In this way, the UAV can perform an inspection of a vertical structure without an operator designating safe locations (e.g., the UAV can travel around the structure and avoid obstacles).

As an example of utilizing sensor data, the UAV can be performing an inspection of a radiator tower for cracks. Since a crack in a radiator can cause a large amount of heat to escape, the UAV can be badly damaged if it is unable to determine that heat is being released at a location along the tower. The UAV can therefore include a sensor designed to detect heat (e.g., a temperature sensor or thermal imager), and can determine that an increasing measurement of heat is being determined along a direction (e.g., along the UAV's descent of a safe location as described and illustrated above). The UAV can then stop traveling along the direction, and move to a subsequent safe location. Since the UAV can therefore miss the inspection of locations (e.g., height intervals) further along the direction, in some implementations the operator can indicate that it's safe for the UAV to travel to the remaining locations along the direction (e.g., below the heat source) utilizing a different path (e.g., as described above with respect to re-taking images).

Cell-Site Determination

An example use of a vertical inspection is inspecting a cell phone tower or antenna structure. The UAV can include sensors that measure wireless signal strength, and can determine whether the cell phone tower is outputting an approved amount of radiation. Additionally, the UAV can map the near-field of the outputted radiation, and determine a far-field pattern. This determined far-field pattern can be provided to, and utilized by, cell phone companies to indicate reception in various locations.

While measuring the signal strength during an inspection of a tower or structure, the UAV computer system may perform conditional operations based on the level of the signal strength. For example, in terms of an RSSI value in dBm, the UAV may maintain a distance from the source of the signal based on a range of the RSSI value. RSSI is usually expressed in decibels from a 0 value to −120 db. The closer the RSSI is to zero, the stronger the signal is. For example, if the UAV is ascending and UAV computer system detects an RSSI in the range of 0 to −15 db, then the UAV may maneuver to a position farther away from the source of the signal so that the RSSI maintains a level of −15 db or lower. Moving farther away from the signal source may help avoid potential RF interference of the UAV electronics due to the proximity of a very strong signal, especially for high gain, narrow beam antennas.

Also, the UAV computer system may log RSSI and geospatial location around a tower and antennas to generate a 3D coverage map of the tower. For example, the UAV may receive a flight plan to fly a pattern of certain distance from the radios on the tower structure. For example, the UAV may fly a 360 degree pattern, or set radius from the tower, at a first altitude below antennas on a tower. The UAV records the geospatial location, and the RSSI. The UAV then may ascend to a higher altitude, and fly another 360 degree pattern, or set radius from the tower, again recording RSSI. The number of different altitudes to fly the 360 degree pattern may be set by the user device. Optionally, the UAV computer system can automatically fly a pattern around the top of the tower, until enough RSSI data is collected to provide a signal strength map of the antenna(s). The RSSI may be recorded for different frequencies of the antennas.

Figure 5:
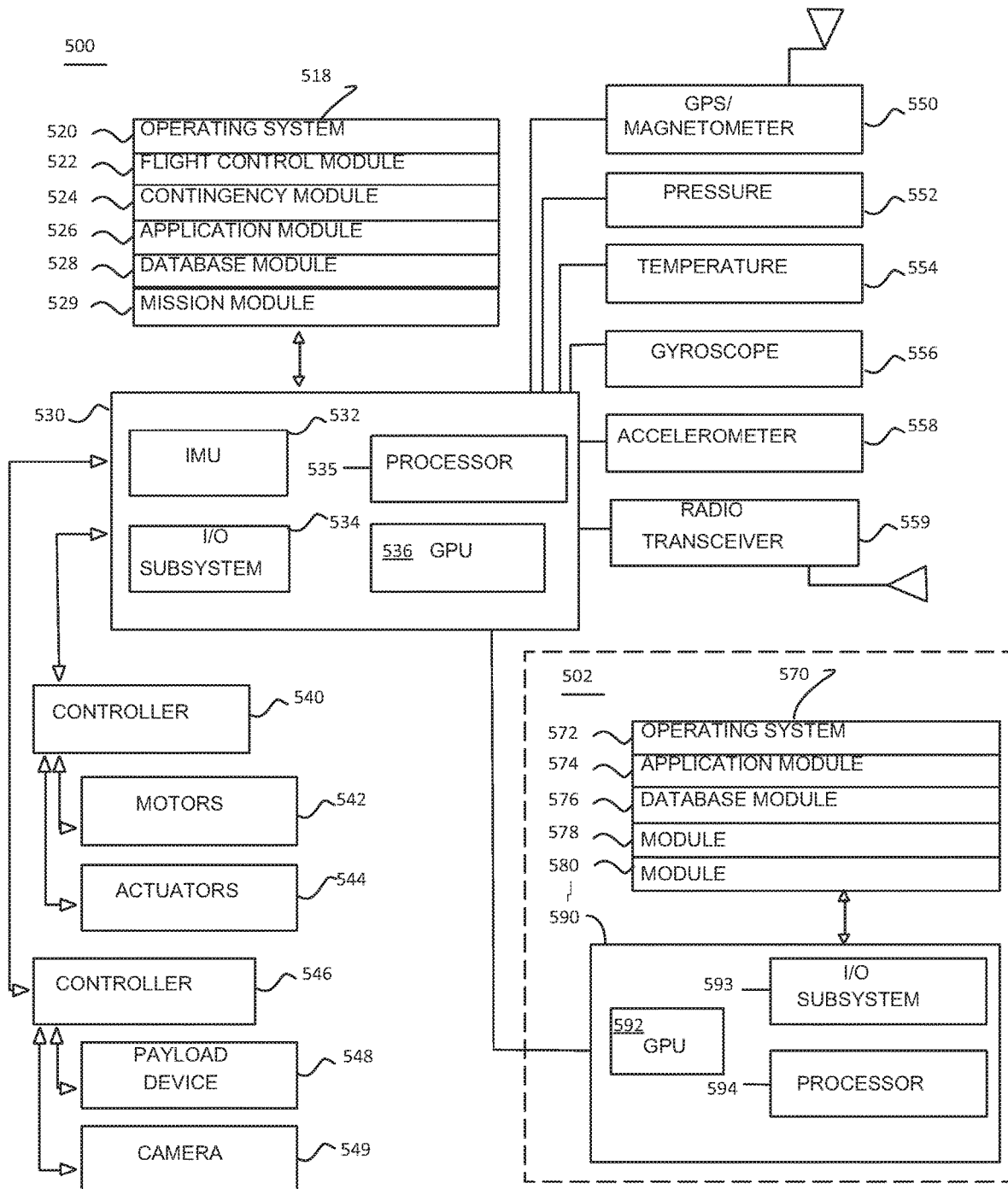
FIG. 5 illustrates a block diagram of an example flight control system architecture for an unmanned aerial vehicle (UAV).

FIG. 5 illustrates a block diagram of an example Unmanned Aerial Vehicle (UAV) architecture for implementing the features and processes described herein. A UAV primary processing system 500 can be a system of one or more computers, or software executing on a system of one or more computers, which is in communication with, or maintains, one or more databases. The UAV primary processing system 500 can be a system of one or more processors 535, graphics processors 536, I/O subsystem 534, logic circuits, analog circuits, associated volatile and/or non-volatile memory, associated input/output data ports, power ports, etc., and/or one or more software processing executing one or more processors or computers. Memory 518 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 550, gyroscopes 556, accelerometers 558, pressure sensors (static or differential) 552, current sensors, voltage sensors, magnetometer, hydrometer, and motor sensors. The UAV may use an inertial measurement unit (IMU) 532 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 500 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module (also referred to as flight control engine) 522 handles flight control operations of the UAV. The module interacts with one or more controllers 940 that control operation of motors 542 and/or actuators 544. For example, the motors may be used for rotation of propellers, and the actuators may be used for flight surface control such as ailerons, rudders, flaps, landing gear, and parachute deployment.

The contingency module 524 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 529 processes the flight plan, waypoints, and other associated information with the flight plan. The mission module 529 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 549, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 518 of the UAV processing system 500.

The UAV processing system 500 may be coupled to various radios, and transmitters 559 for manual control of the UAV, and for wireless or wired data transmission to and from the UAV primary processing system 500, and optionally the UAV secondary processing system 502. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other network-enabled devices. The UAV may use a light-weight tethered wire to a ground control station for communication with the UAV. The tethered wire may be removably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the cloud system. Sensor information, and flight log data, may be stored onto a removeable storage card used by the sensor, or as configured, from the UAV's onboard processing system.

Modules, programs or instructions for performing flight operations, contingency maneuvers, and other functions may be performed with the operating system. In some implementations, the operating system 520 can be a real time operating system (RTOS), UNIX, LINUX, OS X, WINDOWS, ANDROID or other operating system. Additionally, other software modules and applications may run on the operating system, such as a flight control module 522, contingency module 524, application module 526, and database module 528. Typically flight critical functions will be performed using the UAV processing system 500. Operating system 520 may include instructions for handling basic system services and for performing hardware dependent tasks.

In addition to the UAV primary processing system 500, a secondary processing system 502 may be used to run another operating system to perform other functions. A UAV secondary processing system 502 can be a system of one or more computers, or software executing on a system of one or more computers, which is in communication with, or maintains, one or more databases. The UAV secondary processing system 502 can be a system of one or more processors 594, graphics processors 592, I/O subsystem 594 logic circuits, analog circuits, associated volatile and/or non-volatile memory, associated input/output data ports, power ports, etc., and/or one or more software processing executing one or more processors or computers. Memory 570 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 502 will be non-critical functions in nature, that is if the function fails, the UAV will still be able to safely operate. In some implementations, the operating system 572 can be based on real time operating system (RTOS), UNIX, LINUX, OS X, WINDOWS, ANDROID or other operating system. Additionally, other software modules and applications may run on the operating system 572, such as an application module 574, database module 576. Operating system 502 may include instructions for handling basic system services and for performing hardware dependent tasks.

Also, controllers 546 may be used to interact and operate a payload device 948, and other devices such as photographic camera 549, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 902 may have coupled controllers to control payload devices.

User Interfaces for Flight Plan Generation

As described above, a flight plan can be generated that enables an unmanned aerial vehicle (UAV) to conduct an inspection of a vertical structure. As an example, FIGS. 1A-1D illustrate an operator (e.g., the operator 12) indicating vertical inspection locations, and causing (e.g., using a user device) generation of a flight plan to be provided to a UAV. Furthermore, FIG. 6 describes that the operator 12 can view an overview of the flight plan, including representations of the vertical inspection locations set around the vertical structure.

In an effort to simplify and decrease incidences of user-error, increase a speed at which flight plans can be generated, and streamline processing times associated with generating flight plans, user interfaces can be utilized to specify values of parameters describing a vertical structure to be inspected, with the parameters being sufficient to cause the generation of a flight plan. In this specification, each parameter indicates a physical aspect of a vertical structure, such as location information, size information (e.g., a height; a length, area, or volume, of a vertical structure or a portion of the structure to be inspected), shape information, and so on. As will be described, the user interfaces can enable a user to generate flight plans for a wide variety of vertical structures, such as a cell-phone tower, a satellite transmission structure, a radio tower, a transmission tower (e.g., a tower supporting conductors associated with providing power), a wind turbine, and individual types of each listed vertical structure (e.g., particular types of cell-phone towers, such as monopole, lattice, guyed, and so on).

That is, utilizing one or more user interfaces, described below, the user can specify a type of vertical structure, and the user interfaces can present parameters to be specified by the user that are (1) specific to the type of vertical structure (e.g., locations of antennas), and optionally (2) global to multiple types of vertical structures (e.g., height). Since the user merely has to indicate values of parameters, which can be obtained from, for instance, databases (e.g., a database maintained by a company that operates a vertical structure), stored information indicating empirical values determined during prior inspections of the vertical structure, or which can be measured by an operator 12 prior to inspecting the vertical structure, the overall complexity of generating a flight plan can be reduced.

As will be described, a flight planning system, such as the cloud system 120, can be utilized in conjunction with a user device of an operator (hereinafter called a ground control system), to generate a flight plan specific to inspecting a particular real-world vertical structure. For instance, a user of the flight planning system can utilize the above-described user interfaces to specify values of any parameter they may know without having to travel to the vertical structure. An operator can subsequently view the same, or similar, user interfaces, which can populate the values specified by the user, and the operator can specify values of remaining parameters. The operator can then generate a flight plan based on the specified values, which can be provided to a UAV for implementation. The ground control system can include devices, systems, including a tablet, a laptop, a smart phone, a wearable device, or one or more devices, systems, being utilized in combination, and can execute one or more applications (e.g., applications downloaded from an application store that can generate user interfaces) and/or receive user interface information as interactive documents (e.g., web pages) for presentation on the ground control system.

As an example of specifying values by a user of the flight planning system, the user may know a height of the vertical structure, a location (e.g., Global Navigation Satellite System 'GNSS', coordinates indicating a centroid) of the vertical structure, but not be aware of a minimum horizontal distance a UAV has to remain from the vertical structure (e.g., from a centroid, due to antennas, or other components extending horizontally from the vertical structure). The operator can determine (e.g., measure) the minimum horizontal distance, hereinafter referred to as a stand-off distance, and update the user interfaces with the value. Optionally either the flight planning system or ground control system can be utilized solely to specify values, and generate a flight plan associated with conducting the vertical structure.

As described above, a type of vertical structure can be selected by a user, and parameters associated with the selected type of vertical structure can presented. In general, the parameters can include one or more of (1) a location of the vertical structure (e.g., a centroid of the vertical structure, specified by a geospatial reference, such as a horizontal position, GNSS coordinates, and so on), (2) size information (e.g., a height of the vertical structure, a footprint of the vertical structure, and so on), (3) portions of the vertical structure to be inspected (e.g., different types of vertical structures may include differently sized and located portions that are to be inspected, such as for an example type of vertical structure—a top portion can include all of the antennas, support features, and so on). Optionally, the flight planning system can automatically obtain values of one or more of the parameters, and populate the user interfaces with the obtained values (e.g., the flight planning system can access a database, for instance maintained by a cell tower company, that stores one or more values associated with each cell-phone tower).

As described above, with respect to FIGS. 1A-5, a UAV implementing a flight plan can navigate (e.g., at a particular altitude, such as the global minimum safe altitude 30) to a horizontal position associated with a vertical inspection altitude, and descend vertically while capturing images, or other sensor information, of the vertical structure. The flight plan therefore indicates one or more vertical inspection locations at which the UAV will obtain images, or other sensor information, while descending/ascending at horizontal positions associated with the vertical inspection locations. While the parameters describe physical aspects of a vertical structure, to ensure that a UAV obtains imagery, or other sensor information, of the vertical structure at an acceptable level of detail, and navigates along enough vertical inspection locations to obtain a 360-degree view of one or more portions of the vertical structure, the user or operator can indicate a ground sampling distance. In this specification, the ground sampling distance represents a minimum acceptable level of detail to be included in images, or other sensor information, and can be specified in terms of pixels per distance (e.g., image pixels), pixels per distance2, and so on.

The flight planning system can utilize an indicated ground sampling distance, and values of parameters, to determine, for instance, a number of vertical inspection locations (also referred to herein as 'inspection columns', that indicate a column extending upwards from a surface at a horizontal position of a vertical inspection location) set around a vertical structure, respective horizontal positions that each vertical inspection location is to be located (e.g., latitude/longitude, GNSS coordinates), and so on. For instance, the flight planning system can determine that, based on the ground sampling distance (e.g., a minimum level of detail to be included in images captured by a camera of the UAV), each vertical inspection location is to be set at a particular horizontal distance from the vertical structure (e.g., based on particulars of a camera to be utilized, such as focal length(s) of a lens, sensor resolution, and so on). Similarly, the number of vertical inspection locations can be determined such that images can be obtained surrounding the vertical structure (e.g., a 360-degree view, or images of all visible portions of a particular portion of the vertical structure).

Optionally, the flight planning system can obtain information identifying obstacles located proximate to the vertical structure, such as fences, trees or other vegetation, guy-wires, and so on as will be described. The flight planning system can determine that the vertical inspection locations are not to be placed within a threshold distance of the obstacles (e.g., the vertical inspection locations can be rotated about the vertical structure by a same angle, such that a particular obstacle is no longer within a threshold distance of a vertical inspection location, or the vertical inspection locations can be moved closer or farther from the vertical structure). Additionally, for particular obstacles such as trees, fences, buildings, and so on, a parameter can be associated with a lowest altitude at which UAV can freely navigate (e.g., a threshold distance above trees, buildings, and so on). As described above, one or more parameters can indicate portions of the vertical structure that are to be inspected. If the lowest altitude at which the UAV can freely navigate is lower than any portion of the vertical structure to be inspected, the vertical inspection locations may therefore not need to be moved (e.g., due to obstructions, such as trees, buildings) as the UAV will be able to freely navigate while inspecting the portions.

An operator (e.g., the operator 12 as described above) can view—and as will be described—update or modify any values of parameters (e.g., as specified by a user of the flight planning system), vertical inspection locations, and so on, while located proximate to a vertical structure. As described above, a user of the flight planning system may not have access to values of all parameters that need to be specified for the vertical structure (e.g., for a type of vertical structure associated with the vertical structure being inspected); for instance the user may not know, or be able to obtain, a precise measurement of a height of the vertical structure. Therefore, the operator can view the values that have been specified by the user (e.g., the values can automatically populate in a presented user interface), and can specify remaining values of parameters. For example, the operator can utilize a sensor, such as a Lidar, Leddar, and so on, to determine a height of the vertical structure, or a height of trees (e.g., the height of the trees can indicate a height above which the UAV is to remain while inspecting the vertical structure), and can specify the determined heights.

Figure 8:
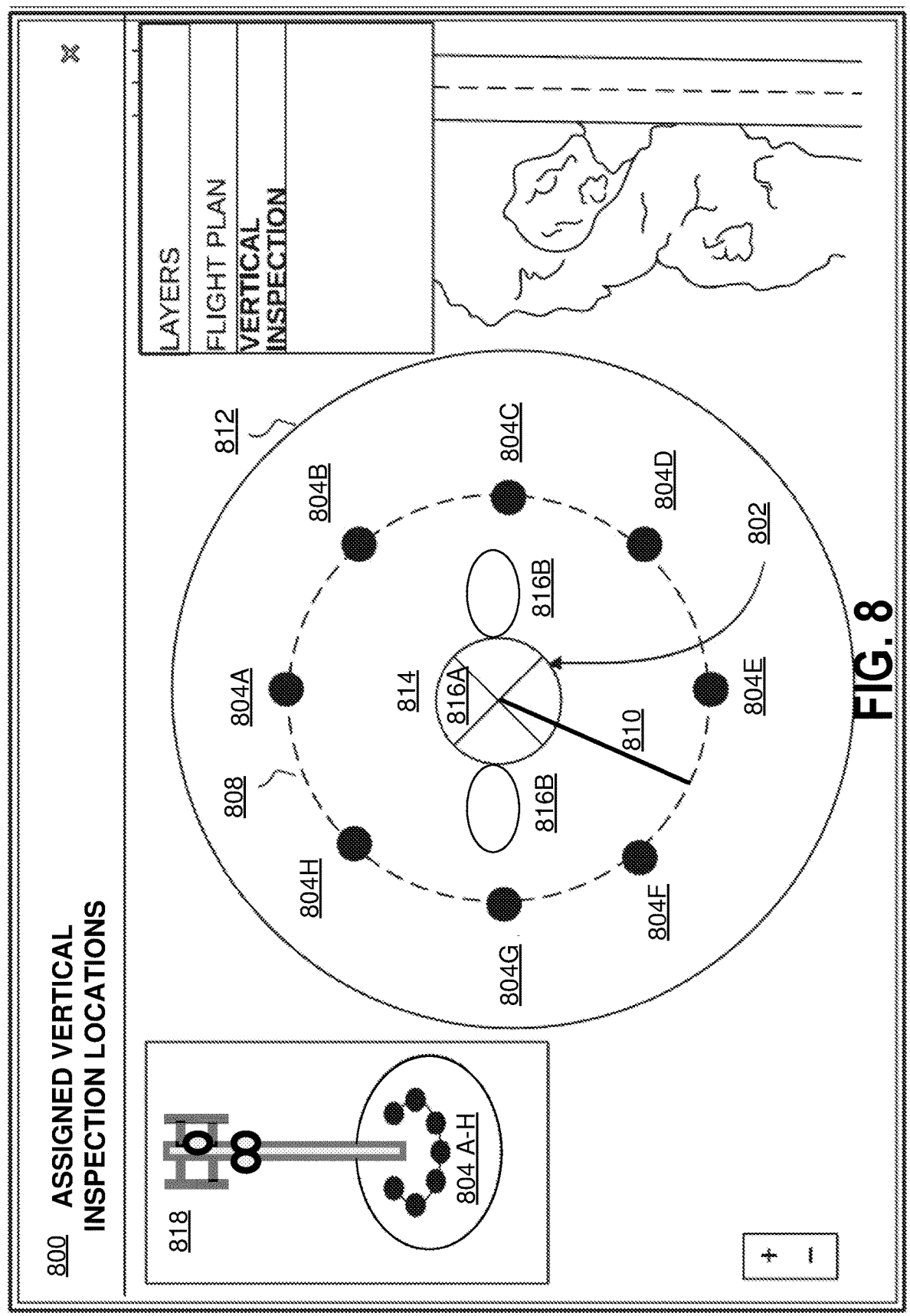
FIG. 8 illustrates a user interface that includes a graphical representation of a flight plan to inspect a real-world vertical structure.

The operator can additionally modify vertical inspection locations, for instance if the user of the flight planning system specified sufficient values of parameters such that the flight planning system generated a flight plan, including horizontal positions of vertical inspection locations, the operator can then view a user interface describing the flight plan (e.g., described further in FIG. 8). As an example, the operator can determine that a particular vertical inspection location is to be relocated to a different horizontal position, and can cause the particular vertical inspection location to be moved farther or closer to the vertical structure, moved to a different horizontal position a same distance from the vertical structure, and so on. Through interactions with a ground control system, the operator can relocate vertical inspection locations, for example as will be described, the operator can interact with a touch screen of the ground control system, and can drag a vertical inspection location to a new horizontal position. Additionally, the operator can cause the rotation of the vertical inspection locations about the vertical structure (e.g., about the centroid of the vertical structure, such as a horizontal location that is a center of a footprint of the vertical structure).

Figure 7A:
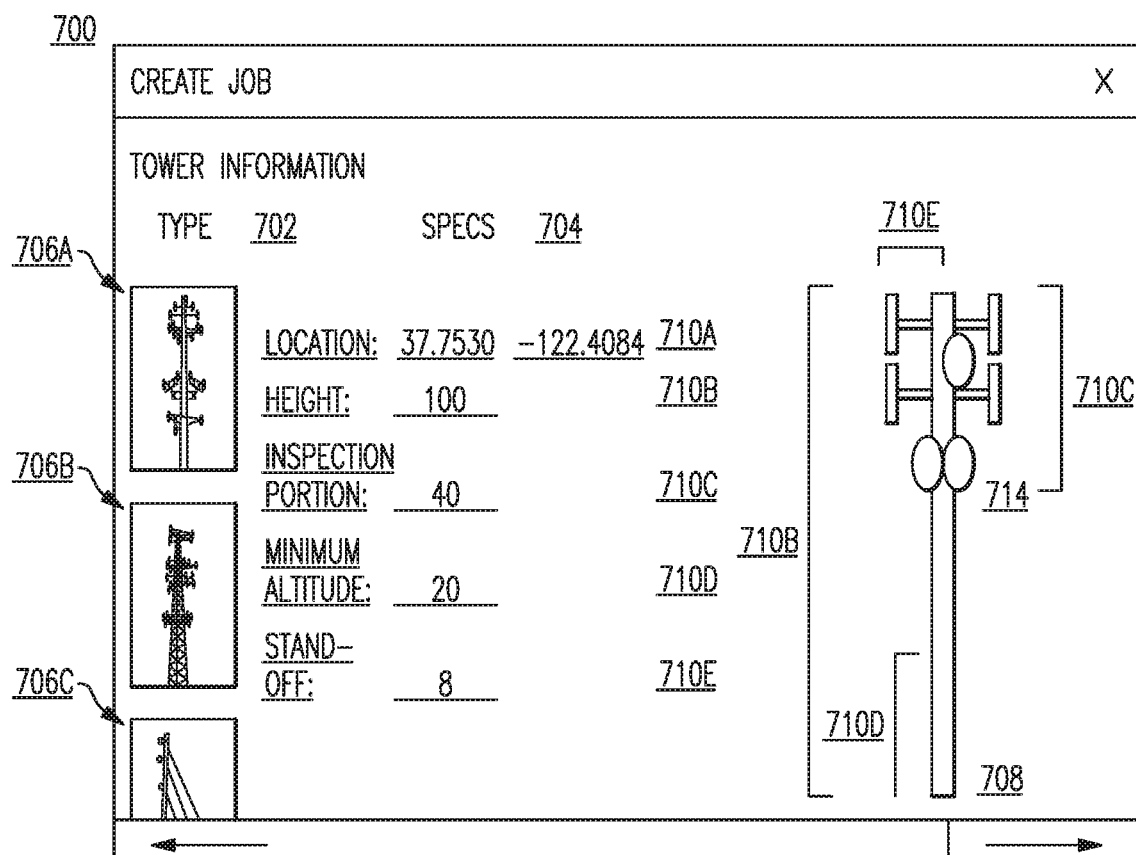
FIG. 7A illustrates an example user interface associated with generating a flight plan to conduct an inspection of a real-world vertical structure.

FIG. 7A illustrates an example user interface 700 associated with generating a flight plan to conduct an inspection of a real-world vertical structure. The user interface 700 is an example of an interactive user interface that can be presented on, or via, a user device or a system of one or more computers. For instance, a ground control system (e.g., the user device 110), or a flight planning system (e.g., the cloud system 120) can generate user interface data (e.g., render user interface data) or execute one or more applications that can generate the user interface 700.

As described above, the user interface 700 can be utilized to generate a flight plan associated with conducting an inspection of the real-world vertical structure, the physical characteristics of which can be described using the user interface 700. A user of the user interface can input, or otherwise enter, information describing the real-world vertical structure. Optionally, the user interface can populate the user interface 700 with information obtained from, for instance, one or more databases as will be described below.

Utilizing the user interface 700, the user can specify a type associated with the real-world vertical structure, with each type indicating a particular model, design, functionality, of a vertical structure associated with a same class of vertical structures (e.g., cell-phone tower, transmission tower, wind turbine, and so on). For instance, the user can specify a particular type of cell-phone tower, such as a monopole, latticed, guyed, and so on. Optionally, utilizing the user interface 700 the user can initially specify a class of vertical structure (e.g., specify whether real-world vertical structure is a cell-phone tower, transmission tower, and so on), and then specify a type of vertical structure associated with the class (e.g., monopole cell-phone tower, two circuit transmission tower). As will be described, each type of vertical structure is associated with respective parameters describing physical aspects of a real-world vertical structure associated with the type. For example, a monopole cell-phone tower can be associated with parameters describing a height of a real-world monopole cell-phone tower, heights of portions of antennas, and so on.

Figure 7B:
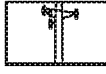
FIG. 7B illustrates another example user interface.

As illustrated in FIG. 7A, differing types 702 of vertical structures associated with a cell-phone tower are presented in the user interface 700. Representations of each type 702 are included in the user interface 700, with the representations being images, drawings, and so on, that are indicative of the type. The representations, as illustrated, include a monopole cell-phone tower 706A, a lattice cell-phone tower 706B, and a guyed cell-phone tower 706C (e.g., a cell-phone tower from which guy-wires connect to a surface, such as the ground, top of a building, and so on). Each representation of a type 702 of vertical structure can be interactive, such that the user of the user interface 700 can select a particular type, and a larger representation of the selected type can be presented (e.g., a larger representation 708 of a monopole cell-phone tower is included at the other end of the user interface 700). As illustrated, for example purposes, the representations of each type 702 do not fit in the user interface 700, and the user can interact with the user interface 700 to display additional types. For instance, FIG. 7B illustrates the user interface 700 manipulated to display the full representation of a guyed cell-phone tower 706C. In this way, representations of multitudes of types of vertical structures can be included in the user interface 700, and at a sufficient size such that the user can view detail. In this way, the user interface solves a problem arising out of technology, that is being able to quickly specify information describing a wide variety of vertical structures, such that flight plans can be generated.

Optionally, the user can interact with each type 702 of vertical structure to cause the associated representation to enlarge in the user interface 700 (e.g., the user can pinch-to-zoom on the user interface 700 at each representation). In this way, the user can view a more detailed version of each type 702 of vertical structure. Optionally, the user interface 7000 can update to include an interactive three-dimensional model associated with each type 702 of vertical structure, such that the user can manipulate the model. For instance, the user can cause the model to rotate about one or more axes by manipulating one or more fingers on the model, or by moving a ground control system or a device about one or more axes.

Upon selection of a type of vertical structure, for instance a monopole cell-phone tower 706A as illustrated, the user interface 700 can present parameters 704 associated with the selected type of vertical structure along with the larger representation 708 (e.g., at the right of the user interface 700). As described above, the parameters are utilized to describe, characterize, physical aspects of real-world vertical structures that are associated with the type. For example, the parameters include a location of a real-world vertical structure (e.g., a horizontal position of a centroid of the real-world vertical structure), a height, one or more inspection portions (e.g., a portion of the real-world vertical structure that is to be inspected, such as a height range), a minimum altitude (e.g., an altitude above which a UAV can freely navigate within a geofence that includes the real-world vertical structure), a stand-off distance (e.g., a horizontal distance away from a centroid of the real-world vertical structure a UAV is to remain), and so on. Generating a flight plan utilizing the parameters will be further described below, with reference to FIG. 8.

Optionally, the user can combine disparate types of vertical structures, and the combined vertical structure can be selected. For instance, the user can indicate that the real-world vertical structure is a lattice cell-phone tower that also includes guy-wires. Similarly, the user can indicate that the real-world vertical structure is a cell-phone tower that includes particular features, such as a microwave, or features to conceal the cell-phone tower (e.g., tree-like features extending from the tower). As described above, particular parameters of a vertical structure may be specific to the vertical structure or may be global to one or more other vertical structures. The combined vertical structure can include parameters that are global to each type of vertical structure that was combined, and also parameters that are specific to each.

One or more of the included parameters 704 can be graphically represented on the larger representation 708 of the selected type of vertical structure. For example, the stand-off distance 710E is illustrated as extending from a horizontal centroid of a support structure (e.g., the pole as illustrated) to a horizontal edge of the real-world vertical structure (e.g., the antennas). As another example, the inspection portion 710C illustrates that the real-world vertical structure is to be inspected from a top of the real-world vertical structure to a particular distance below the top (e.g., the portion can include antennas, connectors, support elements associated with the antennas, satellites, and so on). Through providing visual cues related to each parameter, the user interface 700 can ensure that a user of the user interface 700 enters values (e.g., described below) that correspond to the proper physical aspects.

The user interface 700 can receive user input specifying values associated with each of the included parameters 704. For example, the user can utilize a keyboard to input values (e.g., the user can specify the location by entering numerical GNSS coordinates), and optionally can speak the values into a system or user device being utilized by the user. As described above, the user interface 700 can obtain one or more values of parameters from stored information, such as information stored in accessible databases, and can automatically provide the values for inclusion in the user interface 700. As an example, once the user provides a location of the real-world vertical structure, the system (e.g., flight planning system) or user device (e.g., ground control system) can access stored information describing vertical structures, and after identifying a real-world vertical structure located at the provided location, can obtain values of one or more parameters. The stored information can include information associated with prior flight plans, for instance a prior flight plan may have inspected the real-world vertical structure and specifics of the real-world vertical structure may be subsequently stored (e.g., values of the parameters). The stored information can further include information obtained from a company, regulatory body, governmental entity, and so on, that is associated with the real-world vertical structure (e.g., maintains, operates, monitors, and so on, the real-world vertical structure.

One or more of the parameters 704 can be associated with more than one value, such as the location of the real-world vertical structure (e.g., GNSS coordinates represented by 2 or more values), and optionally one or more parameters can be associated with a range of values, such as for an inspection portion the values can indicate a range of altitudes. Optionally, the values can be associated with more complex information, for instance a user can specify a particular surface area, or volume of space, associated with an inspection portion. That is, the user can indicate that a particular antenna is to be inspected, while other portions of the real-world vertical structure are not to be inspected. Optionally, the user can interact with the larger representation to select a particular inspection portion (e.g., an antenna), and the system or user device can color, or otherwise indicate, a continuous, or semi-continuous, surface associated with the inspection portion (e.g., the system or user device can determine that the user is interested in selecting a particular antenna).

Optionally, the larger representation 708 can be a model (e.g., a three-dimensional model) which the user can rotate, zoom into and out of, and so on. The presented parameters 704 can be specific to one or more perspectives of the presented model. For instance, the stand-off distance 710E can depend on a perspective of the larger representation 708; that is, the real-world vertical structure may have features extending from it along multiple axes. As illustrated, the stand-off distance 710 corresponds to the antenna features extending outwards, however if the larger representation 708 were rotated about an axis (e.g., the x-axis), the user could indicate a stand-off distance 710 that corresponds to the oval elements 714. When generating a flight plan, the ground control system or flight planning system can utilize the multiple stand-off distances, for instance, to determine that the UAV can be closer to the real-world vertical structure when inspecting the oval elements 714 (e.g., and thus obtain more detailed images) than the antennas.

While the user interface 700 includes parameters 704 associated with a monopole cell-phone tower, the user interface 700 can include parameters associated with other types of vertical inspection towers. As an example, parameters associated with a transmission tower can include heights of conductors, spacings between conductors, heights of ground wires, spacings between ground wires, and types of transmission towers can be based on, for example, a number of circuits supported by a transmission tower, an orientation of the circuits, a type of power being carried (e.g., three-phase power, high-voltage direct current power), and so on.

As another example, parameters associated with a guyed cell-phone tower can include information identifying guy-wires, such as locations on the guyed cell-phone tower that include features for connecting a guy-wire (e.g., a connector, a guy-clamp, and so on). For instance, the user can specify one or more heights (e.g., with respect to a surface on which the guyed cell-phone tower sits, an altitude as specified by GNSS coordinates, and so on) at which guy-wires connect to the guyed cell-phone tower. Additionally, the user can specify a frequency at which guy-wires connect at that height, for instance three guy-wires may connect at that height, located at equidistant angles around the guyed cell-phone tower. Optionally, the guy-wires can be assumed to connect to particular portions, or elements, of the guyed cell-phone tower. For example, the guyed cell-phone tower can include tubes of metal connected to each other by lattice elements, and the user interface 700 (e.g., the ground control system or flight planning system) can present the guy-wires as being connected to the tubes at the height.

Optionally to specify locations of guy-wires on a guyed cell-phone tower, the user can interact with a model (e.g., a three-dimensional model) of the guyed cell-phone tower. For instance, the larger representation 708 can be an interactive model, which the user can rotate, zoom into/out of, and so on. As described above, the user can specify a height (e.g., altitude) at which a guy-wire connects to the guyed cell-phone tower, and the user can specify a location of the guy-wire on the model at the specified height. Optionally, after specifying the height, the model can identify (e.g., highlight, color, and so on) the height on the model (e.g., a colored ring can be included on portions of the model that correspond to the height). The user can then interact with the model (e.g., press on a location of the model, long-press, and so on) to specify the location of the guy-wire. Optionally, the location of the interaction can be 'snapped' to a closest corner, tubular element, support structure, and so on, of the guyed cell-phone tower.

The locations of guy-wires can be utilized when generating a flight plan as obstructions that can negatively affect a UAV being able to freely navigate along a vertical direction. For example, as described above (e.g., at least with respect to FIG. 1D), vertical inspection locations can be horizontally positioned around a vertical structure, such that each vertical inspection location is not positioned under a guy-wire (e.g., location 44 in FIG. 1D is positioned under guy-wire 52A, and is thus not a vertical inspection location).

The height and location of each guy-wire (e.g., as specified by the user of the user interface 700) can inform horizontal positions around a guyed cell-phone tower that will be below a guy-wire. For example, when generating a flight plan, the ground control system or flight planning system can determine that a guy-wire connected to the guyed cell-phone tower at a particular location, will extend a threshold horizontal distance along a vector extending normal to the guyed cell-phone tower. Since the threshold distance can depend on a location on a surface (e.g., the ground) at which the guy-wire connects, the threshold distance can be determined to be a constant, or a function based on average lengths of guy-wires based on a height at which they connect to a structure, or angles of guy-wires with respect to a surface on which vertical structures sit, and so on. As another example, the ground control system or flight planning system can obtain right-of-way information, or a property boundary, associated with the guyed cell-phone tower, and can assume that the guy-wire has to connect to a surface (e.g., ground) within the right-of-way or property boundary. In this way, a vertical inspection location can be placed along the vector, if the vertical inspection location is a threshold distance beyond where the guy-wire connects.

Optionally, a vertical inspection location can be placed at a horizontal position that is below a guy-wire (e.g., a horizontal position of a portion of the guy-wire is the same as the horizontal position of the vertical inspection location), if a UAV will not descend below a particular threshold altitude and will thus remain above the guy-wire (e.g., a threshold distance above the guy-wire). For instance, as described above a parameter can be associated with a portion of a vertical structure that is to be inspected (e.g., a top portion of the vertical structure). The ground control system or flight planning system can determine, based on one or more of the height, location, angle, and so on, of each guy-wire, that a UAV will not have to descend to within a threshold distance of the guy-wire. The ground control system or flight planning system can utilize information identifying a location at which each guy-wire connects to the surface (e.g., ground), and optionally an angle of each guy-wire, to determine a height of each guy-wire at horizontal distances from the vertical structure. As described above, and as will be further described, a generated flight plan indicates horizontal positions of each vertical inspection location, which can be based on a ground sampling distance (e.g., a level of detail included in images) specified by a user. That is, the UAV may have to be located closer to the vertical structure to obtain images with greater levels of detail. The ground control system or flight planning system can thus determine that for a vertical inspection location, which is below a guy-wire and which is placed a particular horizontal distance from the vertical structure, the UAV will not descend to within a threshold distance of the guy-wire while inspecting a specified portion of the vertical structure.

Once values of the presented parameters are specified by the user, the user can interact with, for example, user interface element 712 to cause a flight plan to be generated. As described above, one or more values of parameters may not be known to the user of the user interface 700, for instance the user may not know, or be able to determine, a value for the minimum altitude 710D. Optionally, the user may still be able to generate the flight plan with values of particular parameters not specified. For instance, if the user interface 700 is being presented via the flight planning system and the user does not specify a particular parameter (e.g., the minimum altitude 710D), the user can cause the generation of the flight plan including horizontal positions of vertical inspection locations, and an operator can specify the value of the particular parameter upon traveling to the real-world vertical structure.

Optionally, a graphical representation of the flight plan can be generated upon user interaction with the user interface element 712. For instance, the graphical representation can include representations of vertical inspection locations, the real-world vertical structure, and so on.

FIG. 8 illustrates a user interface 800 that includes a graphical representation of a flight plan to inspect a real-world vertical structure 814. The user interface 800 can be generated for presentation (e.g., via the flight planning system or ground control system) upon interaction with the user interface 700 described above (e.g., the user can interact with user interface element 712).

The user interface 800 includes a representation 814 of the real-world vertical structure, which can be based on the real-world vertical structure's horizontal dimensions (e.g., a top-down view of the real-world structure). The horizontal dimensions can be determined based on one or more of the selected type of vertical structure, the stand-off distance, the height, and so on. For instance, the horizontal dimensions of the main support structure 816A (e.g., a pole, lattice element, and so on) can be determined from the type of vertical structure and the height (e.g., the flight planning system or ground control system can access information specifying average size information of vertical structures that correspond to the type of vertical structure and height). Additionally, the horizontal dimensions of the main support structure 816A may be obtained from stored information (e.g., information specified from prior flight plans, or information obtained from a company that controls, maintains, and so on, the real-world vertical structure). Similarly, the antenna elements 816B extending from the main support structure 816A can be determined from the stand-off distance (e.g., the stand-off distance 710E described in FIG. 7A), or from stored information.

Additionally, optionally the user interface 800 can include a standard representation of the main support structure 816A that is not sized according the horizontal dimensions of the real-world vertical structure. Since, as described above, the stand-off distance 710E can be measured from a centroid of the main support structure 816A to a horizontal end of the real-world vertical structure (e.g., the antennas), the stand-off distance alone can define the contours of the real-world vertical structure (e.g., a maximum distance the real-world vertical structure extends from a centroid). As will be described, the flight planning system or ground control system can utilize the stand-off distance and a ground sampling distance (e.g., a level of detail to be included in images) to determine the vertical inspection locations. Therefore, the user interface 800 can optionally include a representation 814 of the real-world vertical structure, which is not necessarily proportional to the real-world vertical structure's dimensions, but can serve merely to graphically describe the flight plan (e.g., vertical inspection locations with respect to the real-world vertical structure).

The user interface 800 further includes representations of vertical inspection locations 804A-804H around the representation 814 of the vertical structure. To determine horizontal positions of each vertical inspection location, the flight planning system or ground control system can utilize a specified ground sampling distance to ensure that a UAV can obtain images of the real-world vertical structure at the ground sampling distance (e.g., images include a minimum level of detail). As described above, the ground sampling distance can be a number of image pixels per distance or image pixels per distance2, and the user can specify an associated value using the user interface 800 (e.g., the user interface 800 can prompt the user). Optionally, the user can provide information (e.g., a configuration file) that specifies the ground sampling distance, or the ground sampling distance can be set as a constant. Optionally, the user interface 700 can prompt the user to specify the ground sampling distance.

When generating the graphical representation of the flight plan, the ground control system or flight planning system, can utilize the ground sampling distance to determine a horizontal distance of the vertical inspection locations 804A-H from the real-world vertical structure, such that a UAV can obtain images of the real-world vertical structure at the ground sampling distance. To determine the horizontal distance, the flight planning system or ground control system can obtain information associated with a camera that will be utilized by a UAV conducting the inspection, including focal length(s) of a lens, sensor resolution and size, and optionally aperture(s) of the lens, and so on (e.g., the user can specify the information, the information can be included in a configuration file, or standard values can be utilized). The flight planning system or ground control system can then determine the horizontal distance from the real-world vertical structure (e.g., from a centroid of the real-world vertical structure, from a surface of the support structure 816A) such that the camera will be able to obtain images at, at least, the ground sampling distance of the support structure, or of a centroid of the real-world vertical structure.

Similarly, the flight planning system or ground control system can determine a number of vertical inspection locations to be included around the real-world vertical structure (e.g., the graphical representation includes vertical inspection locations A-H). The information associated with a camera can be utilized to determine a field of view of the camera (e.g., the field of view can be determined from the focal length, the horizontal distance described above, and optionally aperture(s) to determine depth of field). Since, as described above, a three-dimensional model is to be generated from the images of the real-world vertical structure, the images obtained during the flight plan may need to include a 360-degree view of the vertical structure. Optionally, as described above, the flight plan may be associated with inspecting particular portions of the real-world vertical structure (e.g., an antenna, or multiple antennas), and the vertical inspection locations can be set such that images of all visible portions of the particular portions can be obtained. The flight planning system or ground control system can utilize the field of view to determine a number of vertical inspection locations spaced (e.g., equally spaced, or spaced based on portions being inspected) around the real-world vertical structure.

Optionally, the user interface 800 can include imagery, such as ortho-rectified satellite imagery, of a geographic area that includes the real-world vertical structure. The representations of the vertical inspection locations 804A-804H can be placed on the imagery, such that the user of the user interface 800 can determine whether obstructions exist at the vertical inspection locations. For instance, the flight planning system or ground control system can utilize ortho-rectified imagery that is associated with GNSS coordinates for points in the imagery, and place vertical inspection locations at horizontal positions on the imagery around the real-world vertical structure. Optionally, the ground control system or flight planning system can analyze the imagery to identify obstructions (e.g., trees, walls, buildings, and so on, can be identified). Upon an identification, the user interface 800 can alert the user of the obstruction, and can determine updated vertical inspection locations that are not obstructed (e.g., for recommendation to the user, or automatic replacement).

The user of the user interface 800 can manipulate the representations of the vertical inspection locations 804A-804H to move them away from obstructions. For instance, the user can place one or more fingers on the representations and cause the vertical inspections to be rotated about the real-world vertical structure 814. In another instance, the user can move one or more vertical inspection locations closer to, or farther from, the real-world vertical structure 814. The flight planning system or ground control system can ensure that the vertical inspection locations are not moved farther than the ground sampling distance will allow (e.g., images obtained from too far a distance will not include the minimum level of detail), and similarly, ensure that a UAV will not be closer than a threshold distance to the real-world vertical structure 814. The flight planning system or ground control system can then update the flight plan based on the movements.

As will be described, an operator utilizing a ground control system can visually inspect each vertical inspection location, and upon determining that a vertical inspection location is to be moved, can interact with user interface 800 to cause the vertical inspection locations to be relocated.

The user interface 800 further includes a smaller graphical representation 818 of the flight plan. The smaller graphical representation 818 can include a representation of the selected type of vertical structure and indications of vertical inspection locations around the representation. In this way, the user can view a quick overview of the flight plan.

Figure 9:
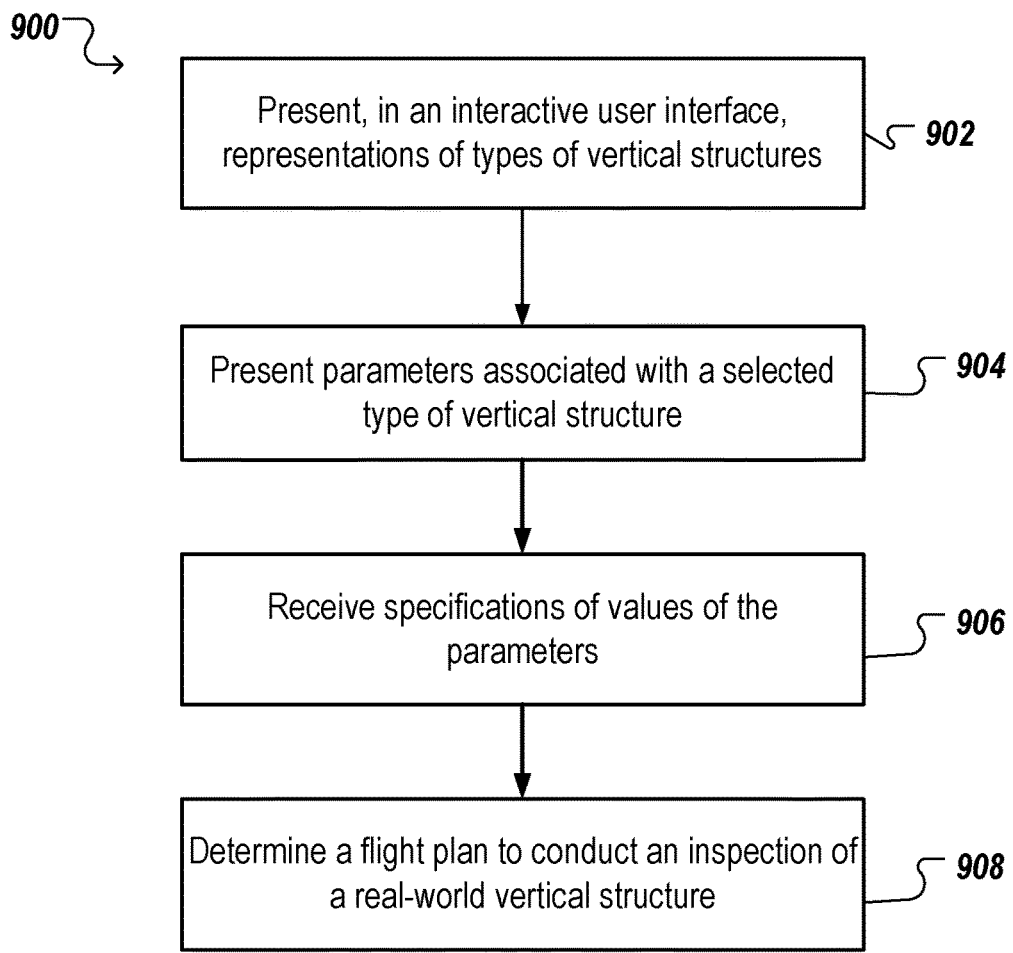
FIG. 9 is a flowchart of an example process for generating a flight plan to conduct an inspection of a real-world vertical structure.

FIG. 9 is a flowchart of an example process 900 for generating a flight plan to conduct an inspection of a real-world vertical structure. For convenience, the process 900 will be described as being performed by a system of one or more computers (e.g., the flight planning system, such as the cloud system 120). One or more blocks included in the process 900 can be performed by a user device of one or more processors (e.g., the ground control system, such as the user device 110).

The system presents representations of types of vertical structure in the interactive user interface (block 902). As illustrated in FIG. 7A, the system can generate user interface data that enables a user to specify values associated with physical aspects of the real-world vertical structure. The system can present indications of classes of vertical structures that can be inspected, such as cell-phone towers, transmission towers, wind turbines, radio antennas, and so on. From the classes of vertical structures, the user can select a particular class, and representations of types of vertical structures associated with the class can be presented. For example, as illustrated in FIG. 7A, representations of cell-phone towers can be presented, such as monopole towers, lattice towers, guyed towers, and so on.

The user can select a type of vertical structure that is associated with the real-world vertical structure. For instance, if the user is to generate a flight plan associated with inspecting a transmission tower with two vertical circuits that carry three-phase power, the user can select a type of vertical structure that corresponds to the transmission tower.

The system presents parameters associated with a selected type of vertical structure (block 904). The system can maintain information associated with each type of vertical structure, with the information including parameters that describe physical aspects of the type of vertical structure. As described above, the parameters can be specific each type of vertical structure, or can be global to one or more other types of vertical structures. For instance, as described above in FIG. 7A, a guyed cell-phone tower may include one or more parameters associated with locations of guy-wires on the guyed cell-phone tower. The locations of guy-wires can be specific to the guyed cell-phone tower, while a stand-off distance or a height of the real-world vertical structure can be global to other types of vertical structures (e.g., all types).

The system receives specifications of values of the parameters (block 906). As described above, the user can specify values of each parameter, with the values describing physical aspects of the real-world vertical structure.

The system determines the flight plan to conduct (e.g., perform) the inspection of the real-world vertical structure (block 908). The user can interact with a user interface element to cause the generation of the flight plan by the system. For instance, as described above, the system can determine horizontal positions of vertical inspection locations around the real-world vertical structure, and determine a number of vertical inspection locations. The horizontal positions and number of the vertical inspection locations can be based on a ground sampling distance (e.g., a level of detail as described above in FIG. 8) and a camera to be utilized during the inspection. Additionally, as described above (e.g., with respect to FIG. 3), the system can determine a geofence that a UAV is to enforce.

As illustrated in FIG. 8, the system can generate a graphical representation of the flight plan. Optionally, if the user did not specify all values of parameters, for instance if the user does not have knowledge of a minimum altitude the UAV is to remain above, the system may not be able to generate the flight plan. Instead, the system can generate, using the specified values, the graphical representation (e.g., FIG. 8) that illustrates horizontal positions of each vertical inspection location and a representation (e.g., top-down) representation of the real-world vertical structure.

As will be described below, with respect to FIG. 10, information associated with the flight plan, including the type of vertical structure, the specified values of parameters, and so on, can be stored by the system. An operator can access the stored information associated with the flight plan (e.g., using a ground control system), and view the same, or similar, user interfaces as the user of the system. The operator can then ensure that all values of parameters are specified, and optionally manipulate the horizontal positions of the vertical inspection locations, and cause the generation of the flight plan (e.g., to be provided to a UAV).

Figure 10:
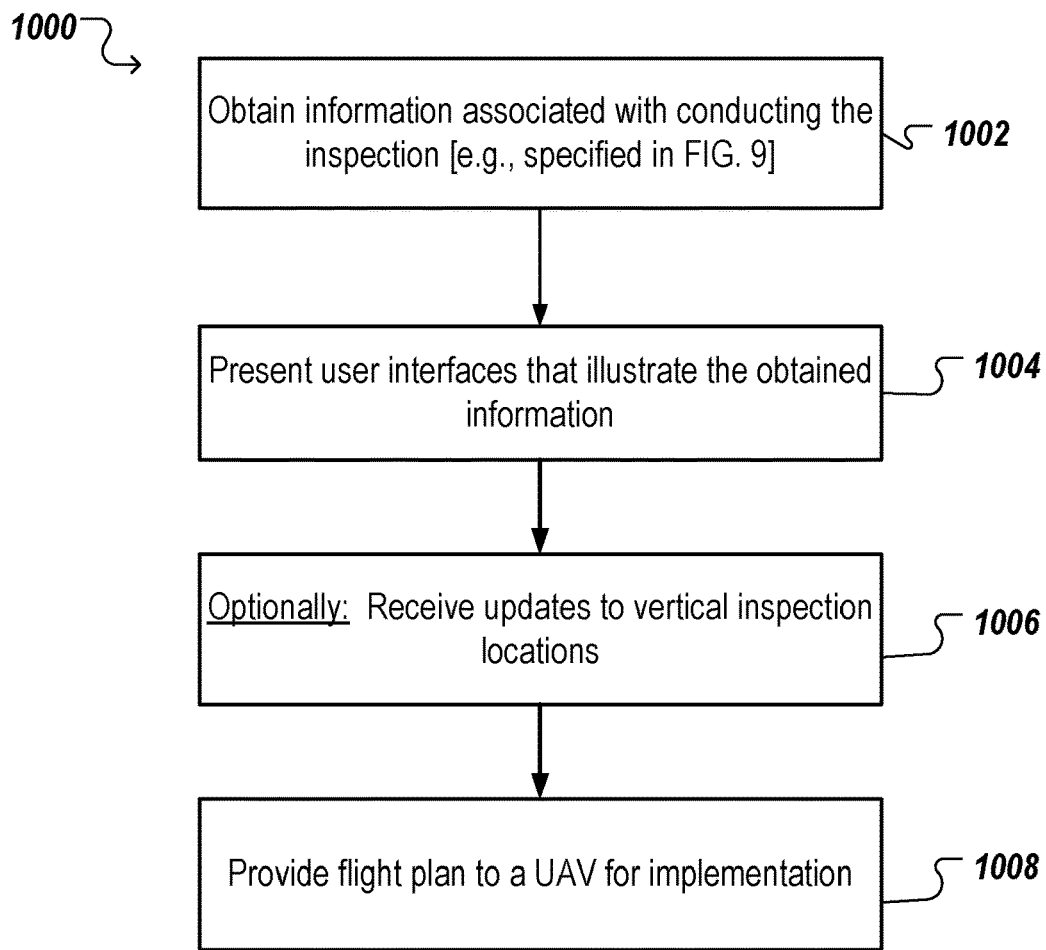
FIG. 10 illustrates an example process for generating or updating a flight plan to conduct an inspection of a real-world vertical structure.

FIG. 10 illustrates an example process 1000 for generating or updating a flight plan to conduct an inspection of a real-world vertical structure. For convenience, the process 1000 will be described as being performed by a user device of one or more processors (e.g., the ground control system, such as the user device 110).

The ground control system obtains information associated with conducting the inspection (block 1002). As described in FIG. 9, a user of a flight planning system can utilize one or more user interfaces to specify information associated with a real-world vertical structure. The user can cause the generation of a flight plan to conduct the inspection, and the ground control system can present a graphical representation of the flight plan. For example, the ground control system can connect to a network (e.g., the Internet over a wireless connection, such as a WiFi, cellular, network) and obtain the generated flight plan.

Alternatively, as described above, the user of the flight planning system may not be able to specify values of all presented parameters, and the specified information can be stored by the flight planning system. The ground control system can obtain the specified information, and graphically present the information.

The ground control system presents one or more user interfaces that illustrate the obtained information (block 1004). The ground control system can present the obtained information using the same, or similar (e.g., formatted to fit a smaller screen size), user interfaces utilized by the user of the flight planning system. For example, the ground control system can present (e.g., in user interface 700) values of parameters that have been specified, and a representation of a type of vertical structure associated with the real-world vertical structure. Similarly, the ground control system can present (e.g., in user interface 800) a graphical representation of a flight plan, such as horizontal positions of the vertical inspection locations around a representation of the real-world vertical structure (e.g., a top-down representation).

The operator can update any value of presented parameter, such as a value of a height of the real-world vertical structure, a minimum distance (e.g., the operator can determine that trees, fences, buildings, and so on are a particular height, and can specify the particular height as the minimum distance), locations of guy-wires (e.g., the operator can utilize a distance sensor, such as Lidar, Leddar, to measure a height that a guy-wire connects to the real-world vertical structure along with an indication of a horizontal position of a guy-wire), and so on. Similarly, the operator can finish specifying values of all of the parameters, and once the values have been updated, or fully specified, the operator can view a graphical representation of a flight plan (e.g., as illustrated in FIG. 8).

As described above, particular parameters associated with types of vertical structures can be specific to a type of vertical structure, or global to one or more other vertical structures. The operator can determine that the obtained information indicates an incorrect type of vertical structure for the real-world vertical structure. That is, the user of the flight planning system may have specified an incorrect type of vertical structure (e.g., accidentally, or the user may have incorrect information). The operator can update the type of vertical structure, and one or more values of parameters that are global between the updated type of vertical structure and the prior type of vertical structure, can remain in the user interface (e.g., user interface 700). Other values of parameters that were specific to the previous type of vertical structure can be discarded. For example, if the prior type of vertical structure is a radio tower, and the updated type of vertical structure is a lattice cell-phone tower, the ground control system can populate a value of a height parameter that was specified for the radio antenna. However, the ground control system can indicate that the operator is to specify a value for one or more other parameters, such as a stand-off distance, and so on.

The ground control system optionally receives updates to vertical inspection locations (block 1006). Once the operator is located proximate to the real-world vertical structure, the operator can confirm whether the horizontal positions of the vertical inspection locations (e.g., determined from a specified ground sampling distance, and camera of a UAV, as described above in FIG. 8) are properly located (e.g., obstructions will not interfere with navigation of a UAV). Additionally, the ground control system can ensure that any modifications to the vertical inspection locations are located within the geofence, such that the flight plan takes place within the geofence.

The ground control system can receive modifications to the vertical inspection locations, including a rotation of the vertical inspection locations about the real-world vertical structure (e.g., a centroid of the real-world vertical structure) by a same angle, or optionally by different angles. For example, the operator can determine that a particular vertical inspection location is within a threshold distance of an obstruction (e.g., a tree, a guy-wire), and that if each vertical inspection location is rotated by a particular angle, the obstruction will not pose a problem. Optionally, the operator can specify locations of particular obstructions in a user interface, such as the user interface 800, and can specify one or more of (1) a size of the obstruction (e.g., dimensions, such as horizontal dimensions and a height, (2) a type of obstruction (e.g., a tree, a fence, a building), and so on. The ground control system can utilize the locations of the particular obstructions to relocate one or more of the vertical inspection locations, so that the obstruction will no longer interfere with navigation of a UAV.

To determine whether the vertical inspection locations are to be moved, the operator can optionally stand at each horizontal position associated with the vertical inspection locations, and determine whether a vertical inspection column extending upwards from the horizontal position will enable a UAV to freely navigate (e.g., no obstructions are within a threshold distance of the horizontal position along a vertical direction). For instance, the operator can interact with the ground control system to obtain the horizontal positions (e.g., GNSS coordinates, such as longitude and latitude), and travel to each horizontal position.

Figure 11:
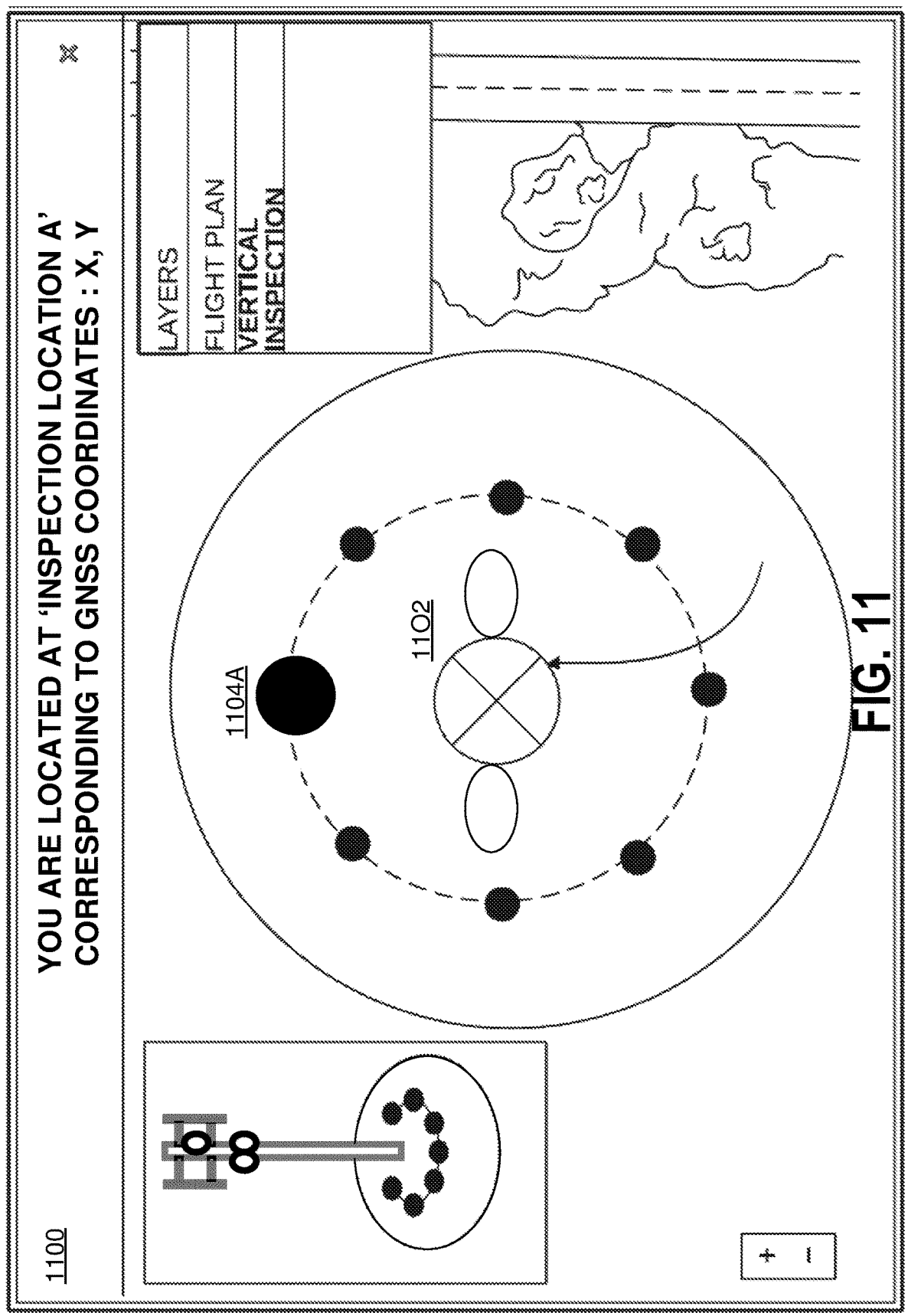
FIG. 11 illustrates an example user interface indicating that an operator is proximate to a vertical inspection location.

Optionally, the ground control system can indicate whether the operator is presently located at a vertical inspection location. As illustrated in FIG. 11, the ground control system can present user interface 1100, such that when the operator is located (e.g., as determined by the ground control system, or a UAV in communication with the ground control system, using a GNSS receiver) at a vertical inspection location (e.g., within a threshold distance of the vertical inspection location), the user interface 1100 will present confirm the location. For instance, user interface 1100 includes a textual message stating that "You are located at 'inspection location A' correspond go GNSS coordinates: X, Y" In this way, the operator can ensure that the UAV will be able to freely navigate along a vertical direction at each horizontal position.

Optionally, the ground control system can utilize augmented reality software or algorithms to provide indications of each vertical inspection column via a display. That is, the ground control system can obtain images (e.g., live images, such as video) using a camera (e.g., a built-in camera, such as a camera on a tablet) of the geographic region and present them in a user interface the operator can view. The ground control system can include indications in the presented user interface of locations (e.g., horizontal positions) of each vertical inspection location. For example, the ground control system can highlight, color, or otherwise identify, a portion of a surface that is associated with a vertical inspection location. Additionally, the ground control system can illustrate a vertical inspection column that extends from the surface at an associated horizontal position upwards. The ground control system can utilize a present position of the ground control system (e.g., determined using a GNSS receiver), along with a field of view of the camera, to determine positions in the obtained images of the geographic area that correspond to vertical inspection locations. In this way, the operator can quickly view a real-world view of the vertical inspection columns. In a further example, the operator can wear glasses, goggles, and so on, that can present augmented reality views.

The ground control system provides a flight plan to a UAV for implementation (block 1008). The operator can interact with a user interface to cause the ground control system to generate a flight plan to conduct an inspection of the real-world vertical structure. For instance, as described above with respect to, at least, FIGS. 1A-1C and FIG. 4, a UAV can navigate at a particular altitude (e.g., a minimum safe altitude), and upon reaching a horizontal position associated with a vertical inspection location, can descend along a vertical direction at the horizontal position (e.g., the UAV can correct its horizontal course while descending, using an included camera and GNSS receiver as described above), and obtain images of the real-world vertical structure (e.g., the camera can point at a centroid of the real-world vertical structure, as specified by a value of a parameter). Optionally, the UAV can descend to a particular altitude indicated by one or more values of a parameter associated with an inspection portion (e.g., as described in FIG. 7A). That is, the UAV can descend until its located within a threshold distance (e.g., a threshold distance above the bottom altitude of the inspection portion, such that the UAV can point a camera downwards, or a threshold distance below the bottom altitude, such that the UAV can point a camera upwards), and can subsequently ascend while obtaining images of the real-world vertical structure. Optionally, the UAV can hover at one or more altitudes while descending/ascending at each horizontal position associated with a vertical inspection location, and can take multitudes of images with the camera moving from an upwards position to a downwards position, or from a downwards position to an upwards position. In this way, the UAV can obtain images from a multitude of angles at various altitudes at each horizontal position.

After the flight plan is conducted, the operator can provide information (e.g., to the flight planning system) describing the flight plan, such as values of the parameters, vertical inspection locations, and so on. In this way, future flight plans to inspect the real-world vertical structure can obtain values of parameters from the information, and have the values automatically populate in a user interface (e.g., user interfaces 700 and 800).

Figure 12:
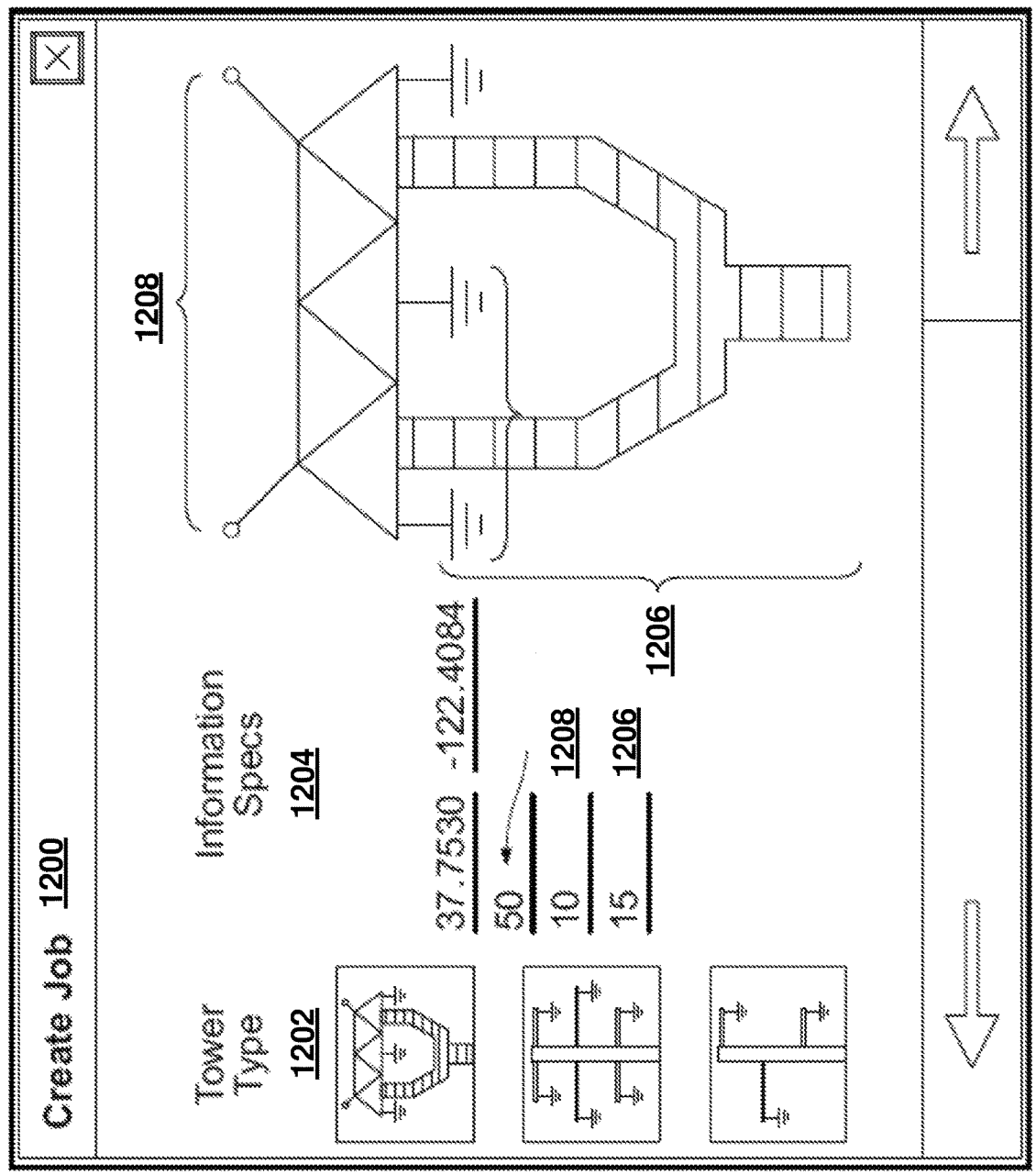
FIG. 12 illustrates an example user interface for describing physical aspects of differing types of vertical structures associated with a transmission tower.

FIG. 12 illustrates an example user interface 1200 for describing physical aspects of differing types 1202 of vertical structures associated with a transmission tower. The user interface 1202 includes a single circuit three-phase power transmission tower 1202, a dual circuit three-phase power transmission tower 1204, and a single circuit three-phase power transmission tower 1206 according to a different orientation of conductors. As described above, with respect to FIG. 7A, a user of the user interface 1200 can specify values of parameters that describe physical aspects of a selected type of transmission tower. For instance, parameters can include, heights of conductors, a number of circuits, location information, a size of the transmission tower, height and location information associated with ground wires, and so on.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the cloud system 120, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of inspecting a vertical structure using an unmanned aerial vehicle, the method comprising:
   determining a flight plan including safe locations around the vertical structure; and
   executing the flight plan by:
   navigating the unmanned aerial vehicle to a first safe location identified in a flight plan;
   navigating vertically along a first column associated with the first safe location;
   activating sensors of the unmanned aerial vehicle to obtain respective sensor information at waypoints along the first column;
   navigating to a second safe location identified in the flight plan;
   navigating vertically along a second column associated with the second safe location; and
   activating the sensors of the unmanned aerial vehicle to obtain respective sensor information at waypoints along the second column.

2. The method of claim 1, wherein activating the sensors of the unmanned aerial vehicle to obtain respective sensor information at the waypoints along the first column or the waypoints along the second column comprises capturing oblique images of the structure by angling one or more of the sensors of the unmanned aerial vehicle upwards or downwards during ascent or decent.

3. The method of claim 1, wherein activating the sensors of the unmanned aerial vehicle to obtain respective sensor information at the waypoints along the first column or the waypoints along the second column comprises activating the sensors responsive to a trigger event to capture data at different stages of the inspection.

4. The method of claim 3, wherein the trigger event comprises a time interval.

5. The method of claim 3, wherein the trigger event comprises a distance descended or ascended to capture data at different stages of the inspection.

6. The method of claim 1, wherein one or more of the sensors of the unmanned aerial vehicle are mounted on a gimbal to allow for different viewing angles.

7. The method of claim 1, wherein the unmanned aerial vehicle or one or more sensors of the unmanned aerial vehicle maintain focus on a centroid of the structure during the inspection.

8. The method of claim 1, further comprising:
   determining a global minimum safe altitude for safer traversal over the structure during the inspection.

9. The method of claim 8, wherein the global minimum safe altitude is determined based on one or more of an environment surrounding the structure and potential obstructions within the environment.

10. The method of claim 1, further comprising:
    identifying a predefined geofence surrounding the structure; and
    executing the flight plan within predefined geofence surrounding the structure.

11. The method of claim 1, further comprising:
    collecting environmental information during the inspection; and
    dynamically adapting the flight path based on this environmental information.

12. The method of claim 11, wherein the environmental information comprises one or more of information about the structure and information about obstacles encountered during the inspection.

13. An apparatus, comprising:
    one or more non-transitory computer readable storage media; and
    program instructions stored on the one or more non-transitory computer readable storage media that, when executed by one or more processors of an unmanned aerial vehicle, direct the unmanned aerial vehicle to:
    navigate to a first safe location identified in a flight plan;
    navigate vertically along a first column associated with the first safe location;
    activate sensors of the unmanned aerial vehicle to obtain respective sensor information at waypoints along the first column;

navigate to a second safe location identified in the flight plan;

navigate vertically along a second column associated with the second safe location; and activate the sensors of the unmanned aerial vehicle to obtain respective sensor information at waypoints along the second column.

14. The apparatus of claim 13, wherein to activate the sensors of the unmanned aerial vehicle to obtain respective sensor information at the waypoints along the first column or the waypoints along the second column, the program instructions, when executed by the one or more processors of the unmanned aerial vehicle, direct the unmanned aerial vehicle to capture oblique images of the structure by angling one or more of the sensors of the unmanned aerial vehicle upwards or downwards during ascent or decent.

15. The apparatus of claim 13, wherein to activate the sensors of the unmanned aerial vehicle to obtain respective sensor information at the waypoints along the first column or the waypoints along the second column, the program instructions, when executed by the one or more processors of the unmanned aerial vehicle, direct the unmanned aerial vehicle to activate the sensors responsive to a trigger event to capture data at different stages of the inspection.

16. The apparatus of claim 13, wherein the unmanned aerial vehicle or one or more sensors of the unmanned aerial vehicle maintain focus on a centroid of the structure during the inspection.

17. The apparatus of claim 13, wherein the program instructions, when executed by the one or more processors of the unmanned aerial vehicle, further direct the unmanned aerial vehicle to:

identify predefined geofence surrounding the structure; and execute the flight plan within predefined geofence surrounding the structure.

18. The apparatus of claim 13, wherein the program instructions, when executed by the one or more processors of the unmanned aerial vehicle, further direct the unmanned aerial vehicle to:

collect environmental information during the inspection, the environmental information comprising one or more of information about the structure and information about obstacles encountered during the inspection; and dynamically adapting the flight path based on this environmental information.

19. An unmanned aerial vehicle, comprising:

a flight control engine configured to at least:

navigate the unmanned aerial vehicle to a first safe location identified in a flight plan;

navigate vertically along a first column associated with the first safe location;

navigate to a second safe location identified in the flight plan; and navigate vertically along a second column associated with the second safe location; and an application engine configured to:

activate sensors of the unmanned aerial vehicle to obtain respective sensor information at waypoints along the first column; and active the sensors of the unmanned aerial vehicle to obtain respective sensor information at waypoints along the second column.

20. The unmanned aerial vehicle of claim 19, wherein the application engine is configured to obtain respective sensor information at the waypoints along the first column or the waypoints along the second column by capturing oblique images of the structure by angling one or more of the sensors of the unmanned aerial vehicle upwards or downwards during ascent or decent.

* * * * *